(12) United States Patent
Iwazaki et al.

(10) Patent No.: US 10,938,318 B2
(45) Date of Patent: Mar. 2, 2021

(54) AC-DC CONVERTING APPARATUS, MOTOR DRIVE CONTROL APPARATUS, BLOWER, COMPRESSOR, AND AIR CONDITIONER

(71) Applicant: Mitsubishi Electric Corporation, Tokyo (JP)

(72) Inventors: Kenji Iwazaki, Tokyo (JP); Takashi Yamakawa, Tokyo (JP); Shigeo Umehara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/605,369

(22) PCT Filed: Jul. 7, 2017

(86) PCT No.: PCT/JP2017/025041
§ 371 (c)(1),
(2) Date: Oct. 15, 2019

(87) PCT Pub. No.: WO2019/008770
PCT Pub. Date: Jan. 10, 2019

(65) Prior Publication Data
US 2020/0328695 A1    Oct. 15, 2020

(51) Int. Cl.
*H02M 7/219*    (2006.01)
*H02P 27/06*    (2006.01)
*F04D 25/06*    (2006.01)

(52) U.S. Cl.
CPC ........ *H02M 7/219* (2013.01); *F04D 25/0693* (2013.01); *H02P 27/06* (2013.01)

(58) Field of Classification Search
CPC ..................................................... H02M 7/12
(Continued)

(56) References Cited

U.S. PATENT DOCUMENTS 4,636,932 A * 1/1987 Kurosawa ........... H02M 7/1623
363/54
4,672,520 A * 6/1987 Ueda ........................ B66B 1/30
363/37
(Continued)

FOREIGN PATENT DOCUMENTS

JP    2011-166949 A    8/2011
JP    2011-259560 A    12/2011
(Continued)

OTHER PUBLICATIONS

Miyashita, O., et al. (1994). High Power Factor PWM Rectifiers with an Analog Pulse-Width Predictor.
(Continued)

*Primary Examiner* — Bentsu Ro
(74) *Attorney, Agent, or Firm* — Posz Law Group, PLC

(57) ABSTRACT

An AC-DC converting apparatus includes: a boost circuit including a reactor supplied with power supply voltage output from an alternating-current power supply, a first leg including a first upper-arm element and a first lower-arm element connected in series, and a second leg connected in parallel with the first leg and including a second upper-arm element and a second lower-arm element connected in series, and boosting the power supply voltage; and a first voltage detecting unit detecting the power supply voltage. When the power supply voltage is positive, the AC-DC converting apparatus causes the first lower-arm element and the second upper-arm element to perform boosting operation alternately every power supply cycle that is cycle of the power supply voltage, and when the power supply voltage is negative, the AC-DC converting apparatus causes the first upper-arm element and the second lower-arm element to perform boosting operation alternately every power supply cycle.

17 Claims, 18 Drawing Sheets

(58) Field of Classification Search
USPC .......................................................... 318/560
See application file for complete search history.

(56) References Cited

U.S. PATENT DOCUMENTS

| | | | |
|---|---|---|---|
| 5,233,509 A | 8/1993 | Ghotbi | |
| 2002/0011852 A1* | 1/2002 | Mandelis | G01R 31/311 |
| | | | 324/750.02 |
| 2011/0019452 A1* | 1/2011 | Shinomoto | H02M 7/217 |
| | | | 363/126 |
| 2011/0194206 A1 | 8/2011 | Sase et al. | |
| 2012/0293141 A1 | 11/2012 | Zhang et al. | |
| 2019/0103808 A1* | 4/2019 | Yamada | H02M 7/25 |

FOREIGN PATENT DOCUMENTS

| | | |
|---|---|---|
| JP | 2012-253967 A | 12/2012 |
| JP | 2014-090544 A | 5/2014 |
| WO | 2012/120788 A1 | 9/2012 |

OTHER PUBLICATIONS

Extended European Sear Report dated May 26, 2020 in the corresponding EP patent application No. 17916786.1 (with English translation).

* cited by examiner

AC-DC CONVERTING APPARATUS, MOTOR DRIVE CONTROL APPARATUS, BLOWER, COMPRESSOR, AND AIR CONDITIONER

CROSS REFERENCE TO RELATED APPLICATION

This application is a U.S. national stage application of International Patent Application No. PCT/JP2017/025041 filed on Jul. 7, 2017, the disclosure of which is incorporated herein by reference.

TECHNICAL FIELD

The present invention relates to an AC-DC converting apparatus that converts alternating-current power into direct-current power, a motor drive control apparatus including the AC-DC converting apparatus, a blower and a compressor including the motor drive control apparatus, and an air conditioner including the blower or the compressor.

BACKGROUND

An AC-DC converting apparatus is a power converting apparatus that converts alternating-current power into direct-current power. The AC-DC converting apparatus causes distortion in the current waveform during operation. Therefore, when the AC-DC converting apparatus is connected to a power system and operated, harmonics flow out to the power system. Since harmonics cause failures, there are international regulations related thereto. The AC-DC converting apparatus needs to comply with the regulations.

One way to comply with the regulations on harmonics is to use a switching element as a rectifying element in the AC-DC converting apparatus. An example of a switching element is a metal-oxide-semiconductor field-effect transistor (MOSFET). In the AC-DC converting apparatus including a switching element, the distortion of the power supply current is reduced by chopping the input power. As a result, harmonics can be reduced.

Patent Literature 1 below discloses a technique for reducing loss using synchronous rectification in a boost type AC-DC converting apparatus in which all of the rectifying elements are switching elements.

Synchronous rectification is control for performing switching in synchronization with the zero-crossing of the power supply voltage of the alternating-current power supply. Therefore, switching is performed when no potential difference occurs across a semiconductor switch, so that no switching loss occurs in principle. On the other hand, at the time of boosting, switching needs to be performed when there is a potential difference across a semiconductor switch. Therefore, switching loss occurs.

Patent Literature

Patent Literature 1: Japanese Patent Application Laid-open No. 2011-259560

Technical Problem

According to the technique of Patent Literature 1, two switching elements out of four switching elements constituting a full bridge circuit operate as boosting switching elements. Therefore, heat generation concentrates on these switching elements. In the case of a configuration in which a heat sink for cooling a switching element is provided for each switching element, the concentration of heat generation on a specific switching element is problematic because the heat sink for cooling the specific switching element should be larger than the other heat sinks. In the case of a configuration in which all of the multiple switching elements are cooled by one heat sink, the heat sink needs to be designed according to the specific switching element, and an increase in the size of the heat sink cannot be avoided. For any of the configurations, measures such as securing an air path for cooling and securing a distance to a heat-sensitive component are also necessary. This leads to the following problem: the size and cost of the apparatus increase.

SUMMARY

The present invention has been made in view of the above, and an object thereof is to obtain an AC-DC converting apparatus capable of avoiding the concentration of heat generation on a specific switching element and preventing an increase in the size and cost of the apparatus.

In order to solve the problems described above and achieve the object, an aspect of the present invention is an AC-DC converting apparatus connected to an alternating-current power supply. The AC-DC converting apparatus includes: a boost circuit comprising a reactor, a first leg, and a second leg, and boosting a first voltage output from the alternating-current power supply, the reactor being connected at one end to the alternating-current power supply and being supplied with the first voltage, the first leg comprising a first upper-arm element and a first lower-arm element connected in series, a connection point between the first upper-arm element and the first lower-arm element being connected to another end of the reactor, the second leg being connected in parallel with the first leg and comprising a second upper-arm element and a second lower-arm element connected in series, a connection point between the second upper-arm element and the second lower-arm element being connected to the alternating-current power supply; and a first voltage detecting unit connected to the alternating-current power supply and detecting the first voltage. When the first voltage is positive, the first lower-arm element and the second upper-arm element are caused to perform boosting operation alternately every first cycle that is a cycle of the first voltage, and when the first voltage is negative, the first lower-arm element and the second upper-arm element are caused to perform boosting operation alternately every first cycle.

The AC-DC converting apparatus according to the present invention can achieve an effect of avoiding the concentration of heat generation on a specific switching element and preventing an increase in the size and cost of the apparatus.

DETAILED DESCRIPTION

Hereinafter, an AC-DC converting apparatus, a motor drive control apparatus, a blower, a compressor, and an air conditioner according to embodiments of the present invention will be described in detail with reference to the accompanying drawings. The present invention is not limited to the following embodiments. In the following description, electrical connection will be simply referred to as "connection".

First Embodiment

Figure 1:
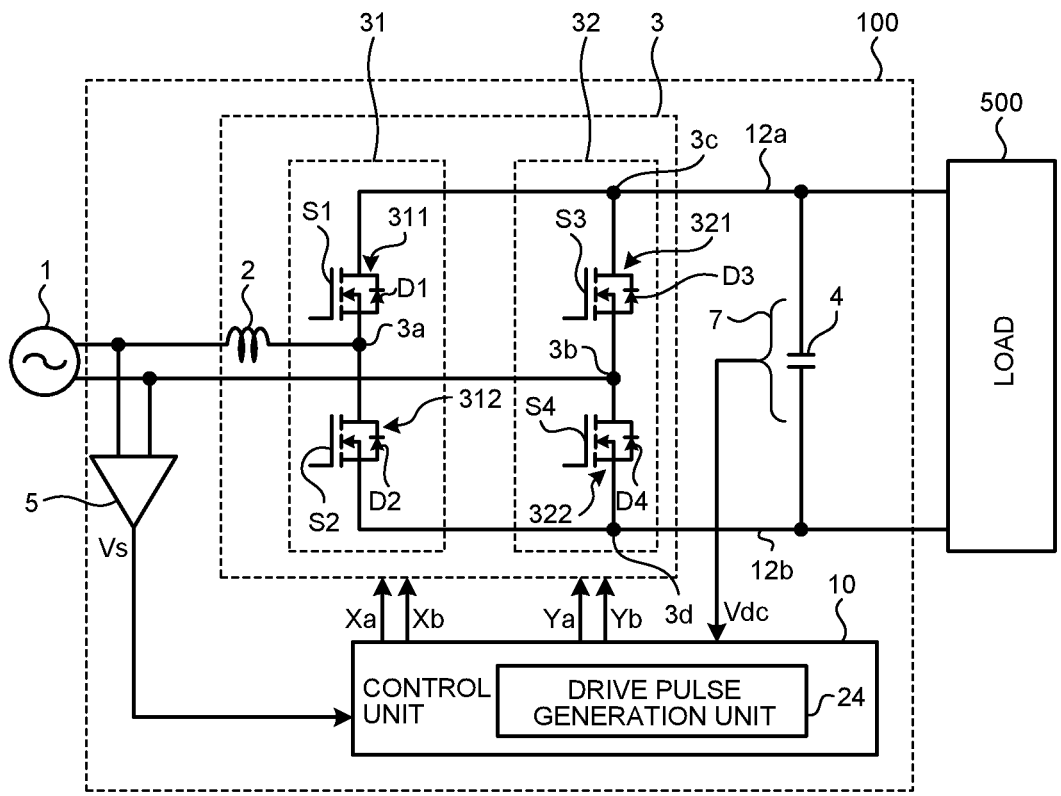
FIG. 1 is a circuit diagram illustrating a configuration of an AC-DC converting apparatus according to a first embodiment.

FIG. 1 is a circuit diagram illustrating a configuration of an AC-DC converting apparatus according to a first embodiment. An AC-DC converting apparatus 100 according to the first embodiment is an AC-DC converting apparatus that converts alternating-current power supplied from a single-phase alternating-current power supply 1 into direct-current power and supplies the direct-current power to a load 500. As illustrated in FIG. 1, the AC-DC converting apparatus 100 according to the first embodiment includes a boost circuit 3, a smoothing capacitor 4, a first voltage detecting unit 5, a second voltage detecting unit 7, and a control unit 10. An example of the load 500 is a three-phase motor incorporated in a blower, a compressor, or an air conditioner.

The boost circuit 3 includes a reactor 2, a first leg 31, and a second leg 32. The first leg 31 and the second leg 32 are connected in parallel. In the first leg 31, a first upper-arm element 311 and a first lower-arm element 312 are connected in series. In the second leg 32, a second upper-arm element 321 and a second lower-arm element 322 are connected in series. One end of the reactor 2 is connected to the alternating-current power supply 1. The other end of the reactor 2 is connected to a connection point 3a between the first upper-arm element 311 and the first lower-arm element 312 in the first leg 31. A connection point 3b between the second upper-arm element 321 and the second lower-arm element 322 is connected to the other end of the alternating-current power supply 1. In the boost circuit 3, the connection points 3a and 3b form an alternating-current terminal. The boost circuit 3 boosts the voltage output from the alternating-current power supply 1. Hereinafter, the voltage output from the alternating-current power supply 1 is referred to as "power supply voltage", and the cycle of the power supply voltage is referred to as "power supply cycle". The power supply voltage may also be referred to as the "first voltage", and the power supply cycle may also be referred to as the "first cycle".

The first upper-arm element 311 includes a switching element S1 and a diode D1 connected in antiparallel to the switching element S1. The first lower-arm element 312 includes a switching element S2 and a diode D2 connected in antiparallel to the switching element S2. The second upper-arm element 321 includes a switching element S3 and a diode D3 connected in antiparallel to the switching element S3. The second lower-arm element 322 includes a switching element S4 and a diode D4 connected in antiparallel to the switching element S4.

FIG. 1 depicts a MOSFET as a non-limiting example of each of the switching elements S1, S2, S3, and S4. A MOSFET is a switching element that allows current to flow in both directions between the drain and the source. Any switching element may be used as long as it allows current to flow in both directions between the first terminal corresponding to the drain and the second terminal corresponding to the source. A material for the switching elements S1, S2, S3, and S4 is exemplified by silicon (Si), silicon carbide (SiC), or gallium nitride (GaN). However, any material other than these may be used.

The term "antiparallel" means that the first terminal corresponding to the drain of the MOSFET is connected to the cathode of the diode and the second terminal corresponding to the source of the MOSFET is connected to the anode of the diode. Note that the diode may be a parasitic diode contained in the MOSFET itself. Parasitic diodes are also called body diodes.

One end of the smoothing capacitor 4 is connected to a direct-current bus 12a on the high-potential side. The direct-current bus 12a is drawn from a connection point 3c between the first upper-arm element 311 in the first leg 31 and the second upper-arm element 321 in the second leg 32. The other end of the smoothing capacitor 4 is connected to a direct-current bus 12b on the low-potential side. The direct-current bus 12b is drawn from a connection point 3d between the first lower-arm element 312 in the first leg 31 and the second lower-arm element 322 in the second leg 32. In the boost circuit 3, the connection points 3c and 3d form a direct-current terminal.

The voltage output from the boost circuit 3 is applied across the smoothing capacitor 4. The smoothing capacitor 4 smooths the voltage output from the boost circuit 3. The smoothing capacitor 4 is connected to the direct-current buses 12a and 12b, and the voltage smoothed by the smoothing capacitor 4 is referred to as "bus voltage". Note that the bus voltage may also be referred to as the "second voltage". The bus voltage is also applied to the load 500.

The first voltage detecting unit 5 is connected in parallel with both ends of the alternating-current power supply 1. The first voltage detecting unit 5 detects a power supply voltage Vs and outputs the power supply voltage Vs to the control unit 10. The power supply voltage Vs is the absolute value of the instantaneous voltage of the alternating-current power supply 1.

The second voltage detecting unit 7 is connected in parallel with both ends of the smoothing capacitor 4. The second voltage detecting unit 7 detects a bus voltage Vdc and outputs the bus voltage Vdc to the control unit 10. The control unit 10 includes a drive pulse generation unit 24.

The drive pulse generation unit 24 is configured from a computing element which is a computing unit. An example of the computing element is a microcomputer. Alternatively, the computing element may be a processor or a processing device called a central processing unit (CPU), a microcomputer, or a digital signal processor (DSP).

The drive pulse generation unit 24 generates a drive pulse for driving the switching element of each arm element constituting the boost circuit 3 on the basis of the values detected by the first voltage detecting unit 5 and the second voltage detecting unit 7.

Hereinafter, "driving the switching element of each arm element" will be described as "driving each arm element" for the sake of convenience. In order to distinguish between the drive pulses for driving the arm elements, the drive pulse for driving the first upper-arm element 311 may be referred to as the "first drive pulse", the drive pulse for driving the first lower-arm element 312 may be referred to as the "second drive pulse", the drive pulse for driving the second upper-arm element 321 may be referred to as the "third drive pulse", and the drive pulse for driving the second lower-arm element 322 may be referred to as the "fourth drive pulse". The first drive pulse corresponds to Xa in the drawings, the second drive pulse corresponds to Xb in the drawings, the third drive pulse corresponds to Ya in the drawings, and the fourth drive pulse corresponds to Yb in the drawings.

Next, the basic circuit operation of the AC-DC converting apparatus 100 according to the first embodiment will be described with reference to FIGS. 1 to 7.

Figure 2:
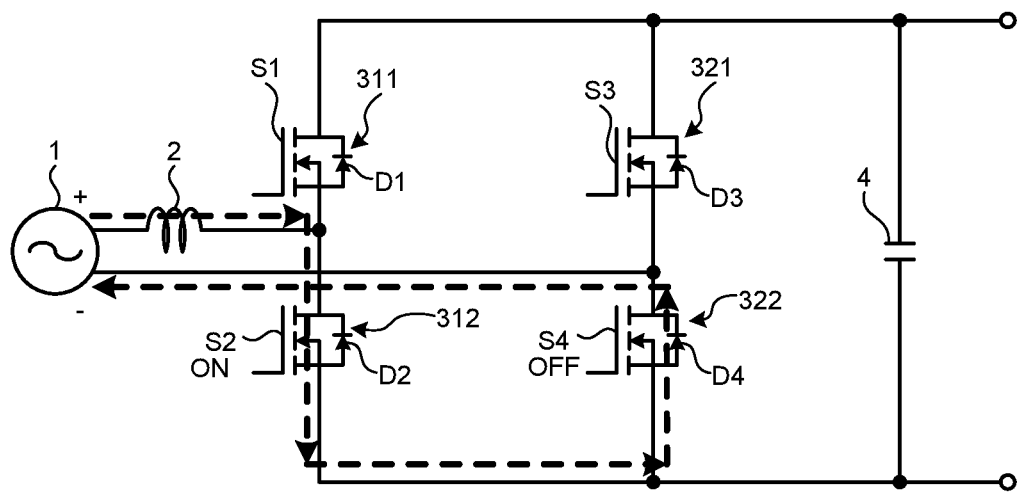
FIG. 2 is a diagram illustrating a short-circuit path for an alternating-current power supply through a reactor for the case that the power supply voltage is positive.
Figure 3:
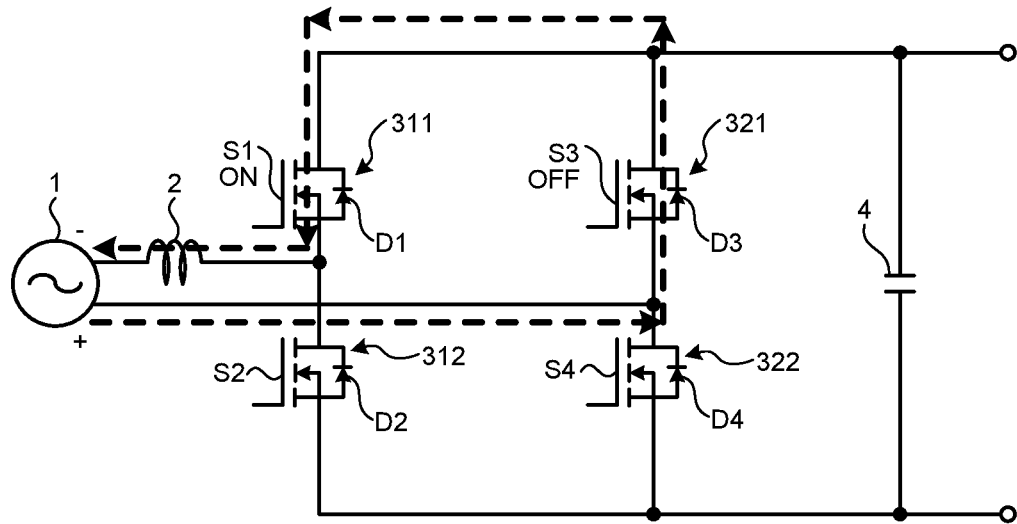
FIG. 3 is a diagram illustrating a short-circuit path for the alternating-current power supply through the reactor for the case that the power supply voltage is negative.
Figure 4:
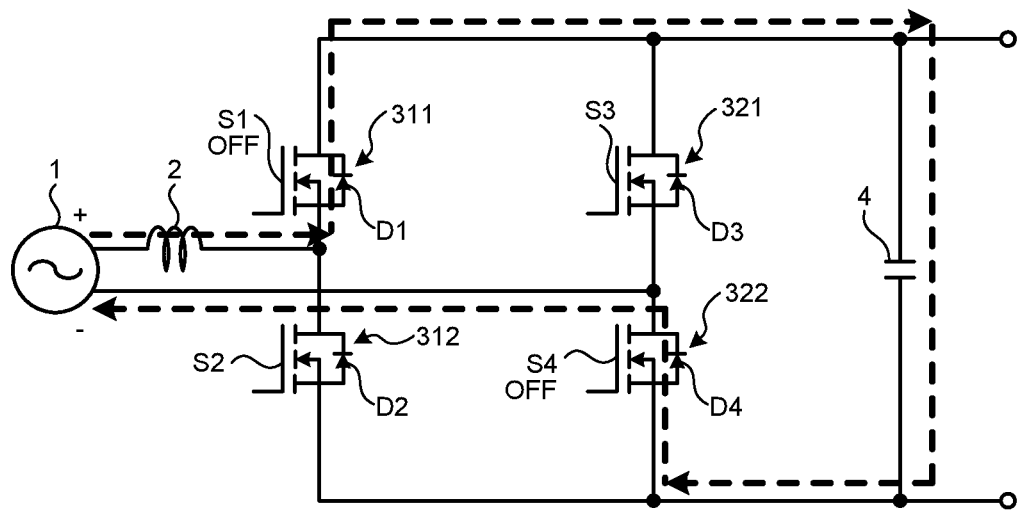
FIG. 4 is a diagram illustrating a charging path for a smoothing capacitor for the case that the power supply voltage is positive.
Figure 5:
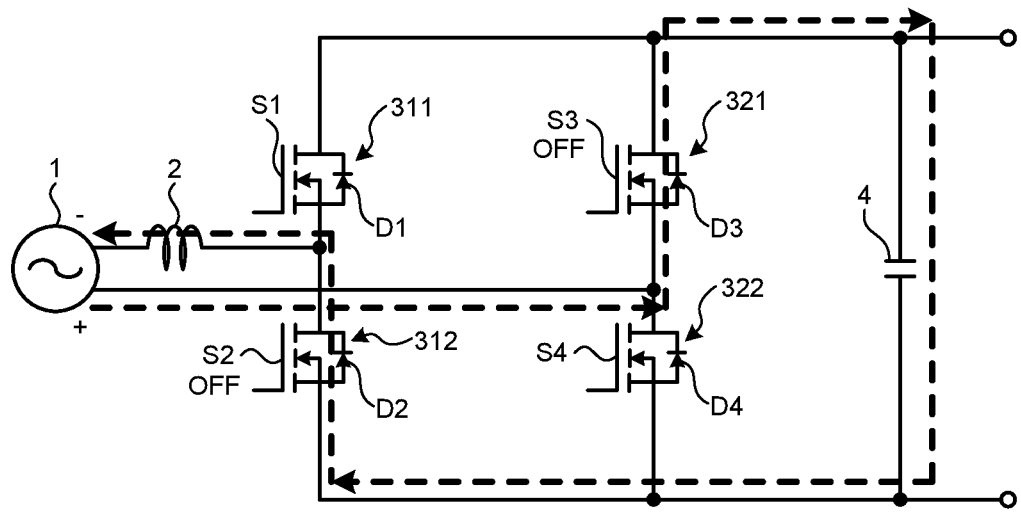
FIG. 5 is a diagram illustrating a charging path for the smoothing capacitor for the case that the power supply voltage is negative.

FIGS. 2 and 3 are diagrams each illustrating how the two ends of the alternating-current power supply 1 are short-circuited through the reactor 2, that is, illustrating a short-circuit path for the alternating-current power supply 1 through the reactor 2. The difference between the two is that the power supply voltage Vs in FIG. 2 is positive and the power supply voltage Vs in FIG. 3 is negative. FIGS. 4 and 5 are diagrams each illustrating a current path for charging the smoothing capacitor 4, that is, a charging path for the smoothing capacitor 4. The difference between the two is that the polarity of the power supply voltage Vs in FIG. 4 is positive, that is, the power supply voltage Vs in FIG. 4 is positive, and the polarity of the power supply voltage Vs in FIG. 5 is negative, that is, the power supply voltage Vs in FIG. 5 is negative. When the upper terminal of the alternating-current power supply 1 has a positive potential as illustrated in FIGS. 2 and 4, the polarity of the power supply voltage Vs is defined as positive. When the upper terminal of the alternating-current power supply 1 has a negative potential as illustrated in FIGS. 3 and 5, the polarity of the power supply voltage Vs is defined as negative.

When the first upper-arm element 311 and the second lower-arm element 322 are not switched on while the power supply voltage Vs is positive, as illustrated in FIG. 4, a charging path is formed through the AC power source 1, the reactor 2, the diode D1, the smoothing capacitor 4, the diode D4, and the alternating-current power supply 1. When the first lower-arm element 312 and the second upper-arm element 321 are not switched on while the power supply voltage Vs is negative, as illustrated in FIG. 5, a charging path is formed through the alternating-current power supply 1, the diode D3, the smoothing capacitor 4, the diode D2, the reactor 2, and the alternating-current power supply 1. The operation mode in which these charging paths are formed is referred to as a "charging mode".

When the first lower-arm element 312 is turned ON while the power supply voltage Vs is positive, as illustrated in FIG. 2, a short-circuit path is formed through the alternating-current power supply 1, the reactor 2, the first lower-arm element 312, the second lower-arm element 322, and the alternating-current power supply 1. When the first upper-arm element 311 is turned ON while the power supply voltage Vs is negative, as illustrated in FIG. 3, a short-circuit path is formed through the alternating-current power supply 1, the second upper-arm element 321, the first upper-arm element 311, the reactor 2, and the alternating-current power supply 1. Forming a short-circuit path is referred to as "power supply short-circuit". The operation mode for power supply short-circuit control is referred to as a "power supply short-circuit mode".

The AC-DC converting apparatus 100 according to the first embodiment controls switching between these operation modes under the control of the control unit 10. In the power supply short-circuit mode, energy is stored in the reactor 2. The stored energy is transferred to the smoothing capacitor 4 in the charging mode, thereby enabling boosting operation. The bus voltage Vdc can be changed by changing at least one of the switching frequency of each arm element in the power supply short-circuit mode and the ratio of the operation time in the power supply short-circuit mode to the operation time in the charging mode.

Figure 6:
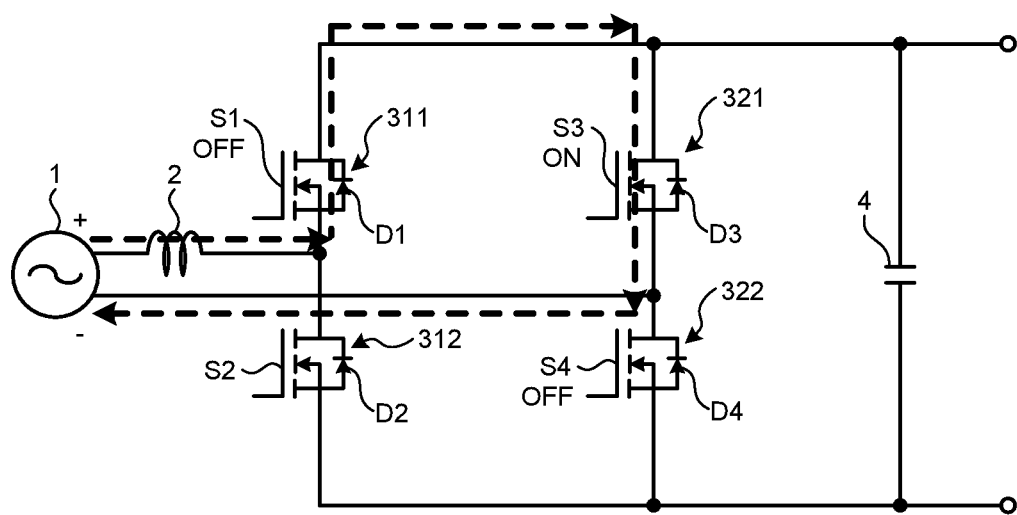
FIG. 6 is a diagram illustrating a current path different from that in FIG. 2 for the case that the power supply voltage is positive in a power supply short-circuit mode.
Figure 7:
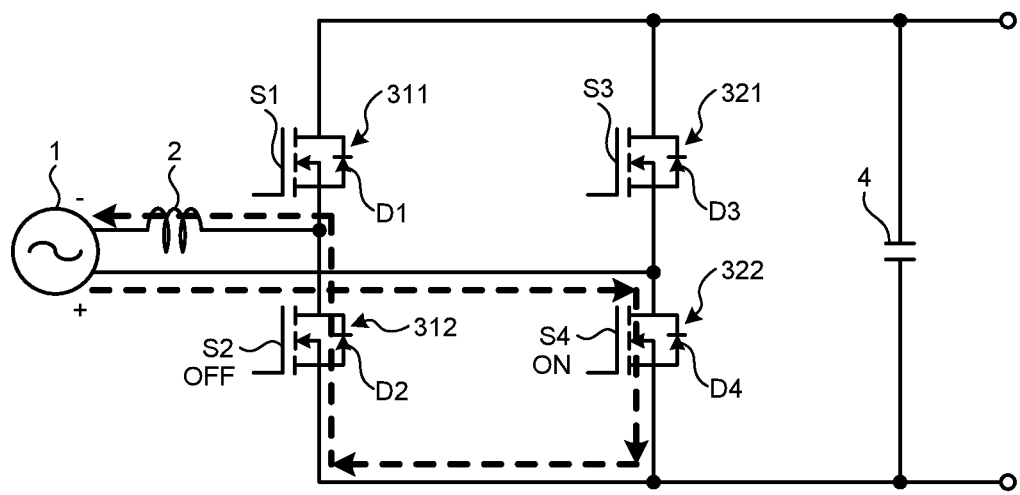
FIG. 7 is a diagram illustrating a current path different from that in FIG. 3 for the case that the power supply voltage is negative in the power supply short-circuit mode.

FIG. 6 is a diagram illustrating a current path different from that in FIG. 2 for the case that the power supply voltage is positive in the power supply short-circuit mode. FIG. 7 is a diagram illustrating a current path different from that in FIG. 3 for the case that the power supply voltage is negative in the power supply short-circuit mode.

When the second upper-arm element 321 is turned ON while the power supply voltage Vs is positive, as illustrated in FIG. 6, a short-circuit path is formed through the alternating-current power supply 1, the reactor 2, the first upper-arm element 311, the second upper-arm element 321, and the alternating-current power supply 1. Comparing FIG. 6 with FIG. 2, the arm element to be turned ON is changed from the first lower-arm element 312 to the second upper-arm element 321.

When the second lower-arm element 322 is turned ON while the power supply voltage Vs is negative, as illustrated in FIG. 7, a short-circuit path is formed through the alternating-current power supply 1, the second lower-arm element 322, the first lower-arm element 312, the reactor 2, and the alternating-current power supply 1. Comparing FIG. 7 with FIG. 3, the arm element to be turned ON is changed from the first upper-arm element 311 to the second lower-arm element 322.

Figure 8:
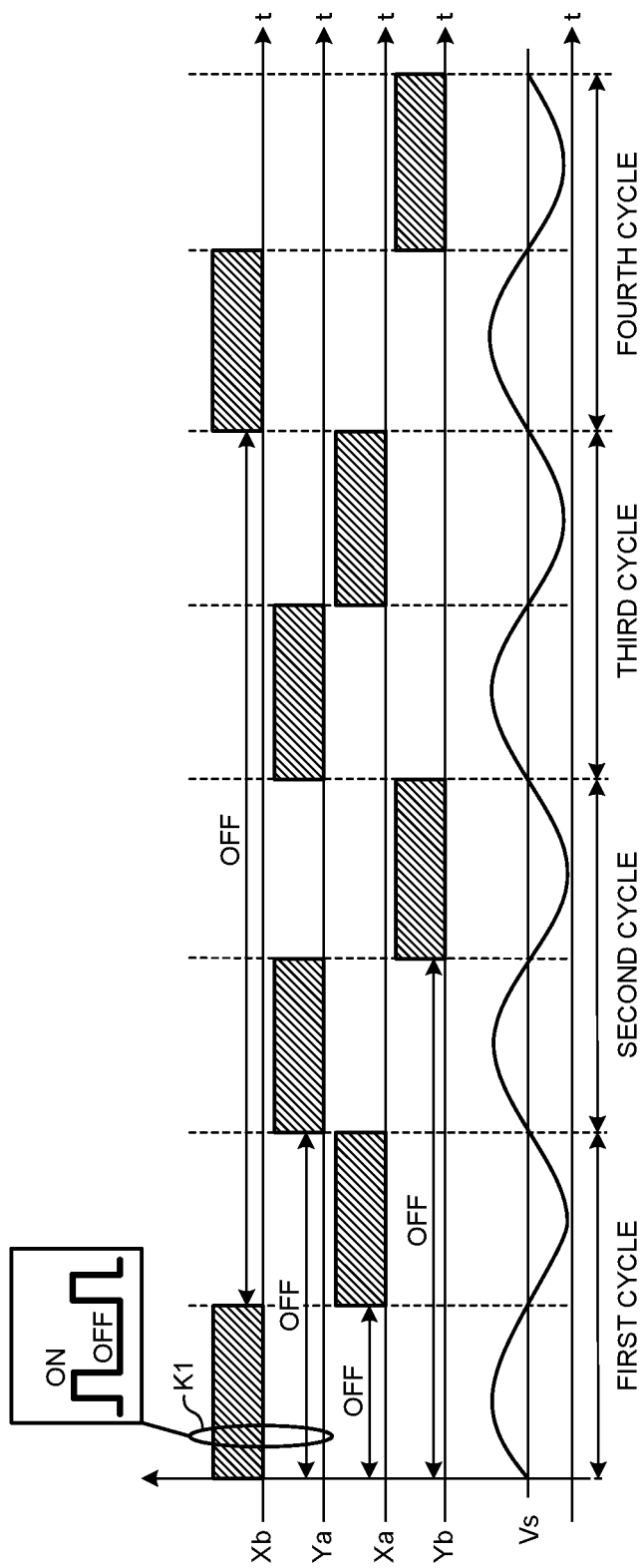
FIG. 8 is a time chart for explaining the operation of a drive pulse generation unit in the first embodiment.

Next, the operation of the AC-DC converting apparatus according to the first embodiment will be described. FIG. 8 is a time chart for explaining the operation of the drive pulse generation unit in the first embodiment.

In FIG. 8, when the power supply voltage Vs is positive in the first cycle of the power supply voltage Vs, the first upper-arm element 311, the second upper-arm element 321, and the second lower-arm element 322 are controlled to be OFF and the first lower-arm element 312 is controlled for boosting operation. FIG. 8 depicts an enlarged waveform of K1 surrounded by an ellipse, which shows the boosting operation of the first lower-arm element 312. As indicated by K1, the first lower-arm element 312 is repeatedly turned ON and OFF. The ON state is the operation in the power supply short-circuit mode illustrated in FIG. 2. The OFF state is the operation in the charging mode illustrated in FIG. 4.

When the power supply voltage Vs is negative in the first cycle of the power supply voltage Vs, the first lower-arm element 312, the second upper-arm element 321, and the second lower-arm element 322 are controlled to be OFF and the first upper-arm element 311 is controlled for boosting operation. Although an enlarged waveform of the first upper-arm element 311 is not illustrated, its operation is similar to the operation indicated by the enlarged waveform of K1. That is, the first upper-arm element 311 is repeatedly turned ON and OFF. The ON state is the operation in the power supply short-circuit mode illustrated in FIG. 3. The OFF state is the operation in the charging mode illustrated in FIG. 5.

When the power supply voltage Vs is positive in the second cycle of the power supply voltage Vs, the first upper-arm element 311, the first lower-arm element 312, and the second lower-arm element 322 are controlled to be OFF and the second upper-arm element 321 is controlled for boosting operation. Although an enlarged waveform of the second upper-arm element 321 is not illustrated, its operation is similar to the operation indicated by the enlarged waveform of K1. That is, the second upper-arm element 321 is repeatedly turned ON and OFF. The ON state is the operation in the power supply short-circuit mode illustrated in FIG. 6. The OFF state is the operation in the charging mode illustrated in FIG. 4.

When the power supply voltage Vs is negative in the second cycle of the power supply voltage Vs, the first upper-arm element 311, the first lower-arm element 312, and the second upper-arm element 321 are controlled to be OFF and the second lower-arm element 322 is controlled for boosting operation. Although an enlarged waveform of the second lower-arm element 322 is not illustrated, its operation is similar to the operation indicated by the enlarged waveform of K1. That is, the second lower-arm element 322 is repeatedly turned ON and OFF. The ON state is the operation in the power supply short-circuit mode illustrated in FIG. 7. The OFF state is the operation in the charging mode illustrated in FIG. 5.

In and after the third cycle of the power supply voltage Vs, the drive pulse of the first cycle and the drive pulse of the second cycle are alternately repeated. In the time chart of FIG. 8, when the power supply voltage is positive, the second upper-arm element 321 is caused to perform boosting operation in the second and third cycles and the first lower-arm element 312 is caused to perform boosting operation in the first and fourth cycles. Such a way of switching is also included in switching on a power supply cycle basis.

Referring to FIG. 8, the boosting operation of each of the first upper-arm element 311, the first lower-arm element 312, the second upper-arm element 321, and the second lower-arm element 322 appears once in a period twice as long as the power supply cycle. That is, the first upper-arm element 311, the first lower-arm element 312, the second upper-arm element 321, and the second lower-arm element 322 operate equally and evenly. As a result, these arm elements generate heat uniformly, avoiding the situation in which heat generation concentrates on a specific switching element. Therefore, the problem of an increase in the size of a heat sink is solved. In addition, measures such as securing an air path for cooling and securing a distance to a heat-sensitive component are unnecessary. This solves the problem of an increase in the size and cost of the apparatus.

Figure 9:
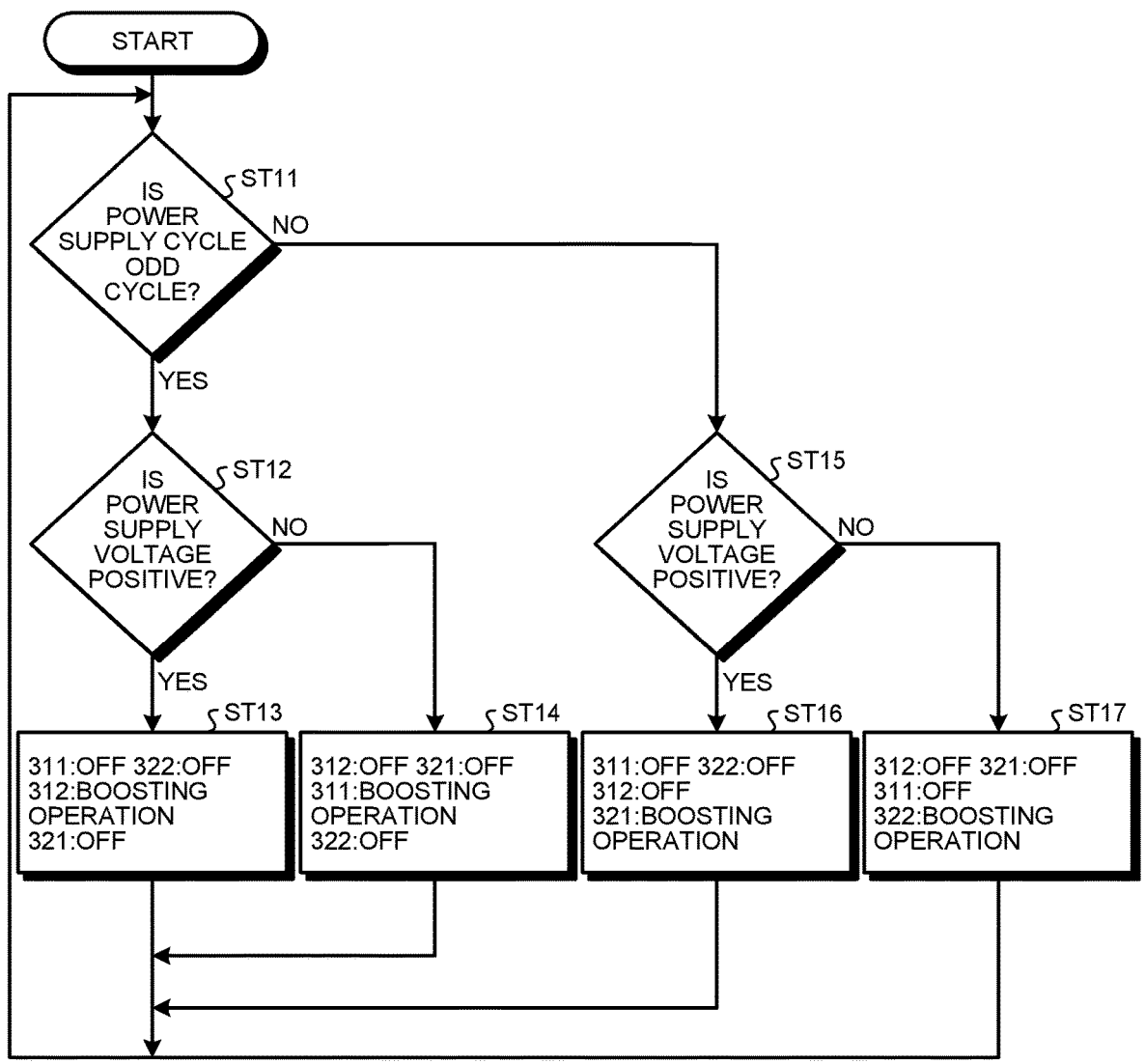
FIG. 9 is a flowchart illustrating the operation of the drive pulse generation unit in the first embodiment.

Next, the procedure for control of the AC-DC converting apparatus according to the first embodiment will be described. FIG. 9 is a flowchart illustrating the operation of the drive pulse generation unit 24 in the first embodiment.

In step ST11, it is determined whether the power supply cycle is an odd cycle. The first power supply cycle is an odd cycle, and the second power supply cycle is an even cycle. Subsequently, odd and even cycles are alternately repeated.

If the power supply cycle is an odd cycle (Yes in step ST11), the process proceeds to step ST12, where it is determined whether the power supply voltage is positive. If the power supply voltage is positive (Yes in step ST12), the process proceeds to step ST13. In step ST13, the first upper-arm element 311, the second upper-arm element 321, and the second lower-arm element 322 are controlled to be OFF. On the other hand, the first lower-arm element 312 is controlled for boosting operation. When step ST13 ends, the process returns to step ST11.

In step ST12 described above, if the power supply voltage is negative (No in step ST12), the process proceeds to step ST14. In step ST14, the first lower-arm element 312, the second upper-arm element 321, and the second lower-arm element 322 are controlled to be OFF. On the other hand, the first upper-arm element 311 is controlled for boosting operation. When step ST14 ends, the process returns to step ST11.

In step ST11, if the power supply cycle is an even cycle (No in step ST11), the process proceeds to step ST15, where it is determined whether the power supply voltage is positive. If the power supply voltage is positive (Yes in step ST15), the process proceeds to step ST16. In step ST16, the first upper-arm element 311, the first lower-arm element 312, and the second lower-arm element 322 are controlled to be OFF. On the other hand, the second upper-arm element 321 is controlled for boosting operation. When step ST16 ends, the process returns to step ST11.

In step ST15 described above, if the power supply voltage is negative (No in step ST15), the process proceeds to step ST17. In step ST17, the first upper-arm element 311, the first lower-arm element 312, and the second upper-arm element 321 are controlled to be OFF. On the other hand, the second lower-arm element 322 is controlled for boosting operation. When step ST17 ends, the process returns to step ST11. Subsequently, steps ST11 to ST17 described above are repeated.

In the above description, when the power supply voltage is positive and the power supply cycle is an odd cycle, the first upper-arm element 311, the second upper-arm element 321, and the second lower-arm element 322 are controlled to be OFF and the first lower-arm element 312 is controlled for boosting operation. However, the present invention is not limited to this example. When the power supply voltage is positive and the power supply cycle is an odd cycle, the first upper-arm element 311, the first lower-arm element 312, and the second lower-arm element 322 may be controlled to be OFF and the second upper-arm element 321 may be controlled for boosting operation.

In the above description, when the power supply voltage is negative and the power supply cycle is an odd cycle, the first lower-arm element 312, the second upper-arm element 321, and the second lower-arm element 322 are controlled to be OFF and the first upper-arm element 311 is controlled for boosting operation. However, the present invention is not limited to this example. When the power supply voltage is negative and the power supply cycle is an odd cycle, the first upper-arm element 311, the first lower-arm element 312, and the second upper-arm element 321 may be controlled to be OFF and the second lower-arm element 322 may be controlled for boosting operation.

In the above description, when the power supply voltage is positive and the power supply cycle is an even cycle, the first upper-arm element 311, the first lower-arm element 312, and the second lower-arm element 322 are controlled to be OFF and the second upper-arm element 321 is controlled for boosting operation. However, the present invention is not limited to this example. When the power supply voltage is positive and the power supply cycle is an even cycle, the first upper-arm element 311, the second upper-arm element 321, and the second lower-arm element 322 may be controlled to be OFF and the first lower-arm element 312 may be controlled for boosting operation.

In the above description, when the power supply voltage is negative and the power supply cycle is an even cycle, the first upper-arm element 311, the first lower-arm element 312, and the second upper-arm element 321 are controlled to be OFF and the second lower-arm element 322 is controlled for boosting operation. However, the present invention is not limited to this example. When the power supply voltage is negative and the power supply cycle is an even cycle, the first lower-arm element 312, the second upper-arm element 321, and the second lower-arm element 322 may be controlled to be OFF and the first upper-arm element 311 may be controlled for boosting operation.

As described above, in the first embodiment, when the power supply voltage is positive, switching is performed such that the first lower-arm element 312 and the second upper-arm element 321 located at diagonal positions on the circuit diagram are caused to perform boosting operation alternately.

As described above, in the first embodiment, when the power supply voltage is negative, switching is performed such that the first upper-arm element 311 and the second lower-arm element 322 located at diagonal positions on the circuit diagram are caused to perform boosting operation alternately.

Owing to the above-described operation, in the AC-DC converting apparatus according to the first embodiment, all the arm elements constituting the boost circuit 3, namely the first upper-arm element 311, the first lower-arm element 312, the second upper-arm element 321, and the second lower-arm element 322, operate equally, whereby the concentration of heat generation on a specific arm element can be avoided. This makes it possible to prevent an increase in the size and cost of the apparatus.

Second Embodiment

In the first embodiment, the arm element to be caused to perform boosting operation is switched on a power supply cycle basis. On the other hand, in a second embodiment, the arm element to be caused to perform boosting operation is switched on a carrier cycle basis. Note that the carrier cycle may also be referred to as a "second cycle". The carrier cycle is shorter than the power supply cycle.

Next, the operation of the AC-DC converting apparatus according to the second embodiment will be described. Note that the configuration of the AC-DC converting apparatus according to the second embodiment is the same as that illustrated in FIG. 1.

Figure 10:
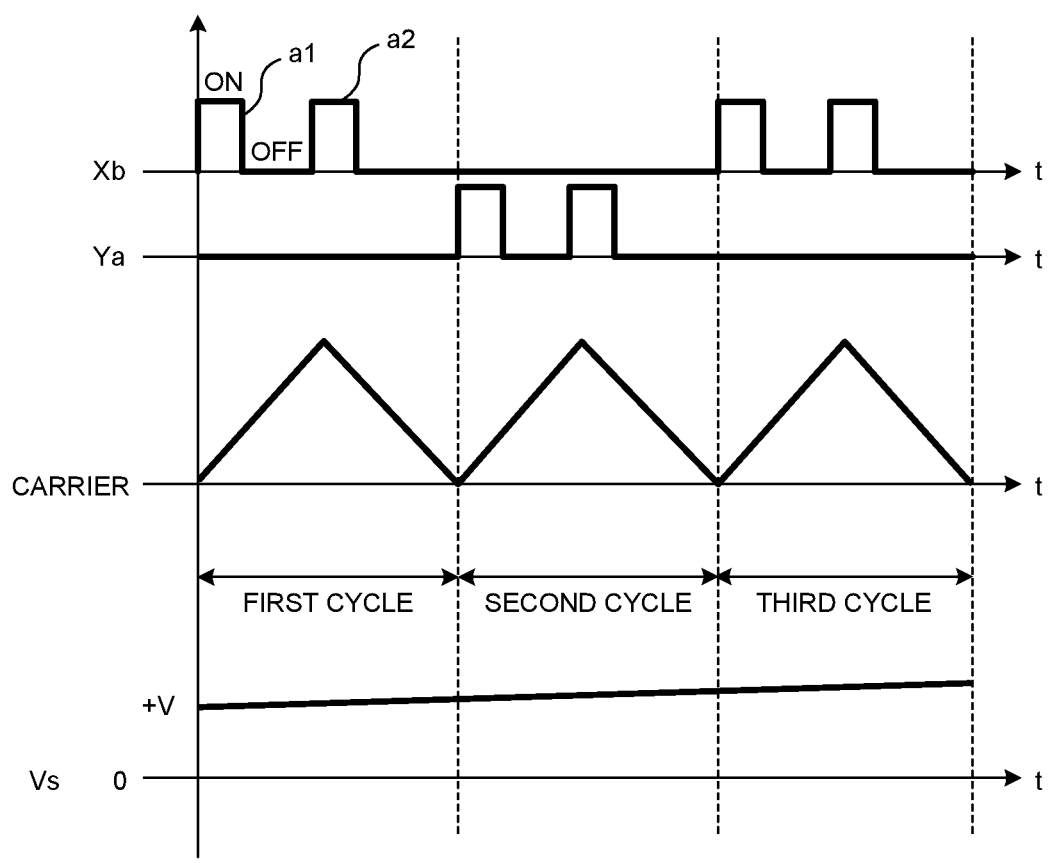
FIG. 10 is a first time chart for explaining the operation of a drive pulse generation unit in a second embodiment.
Figure 11:
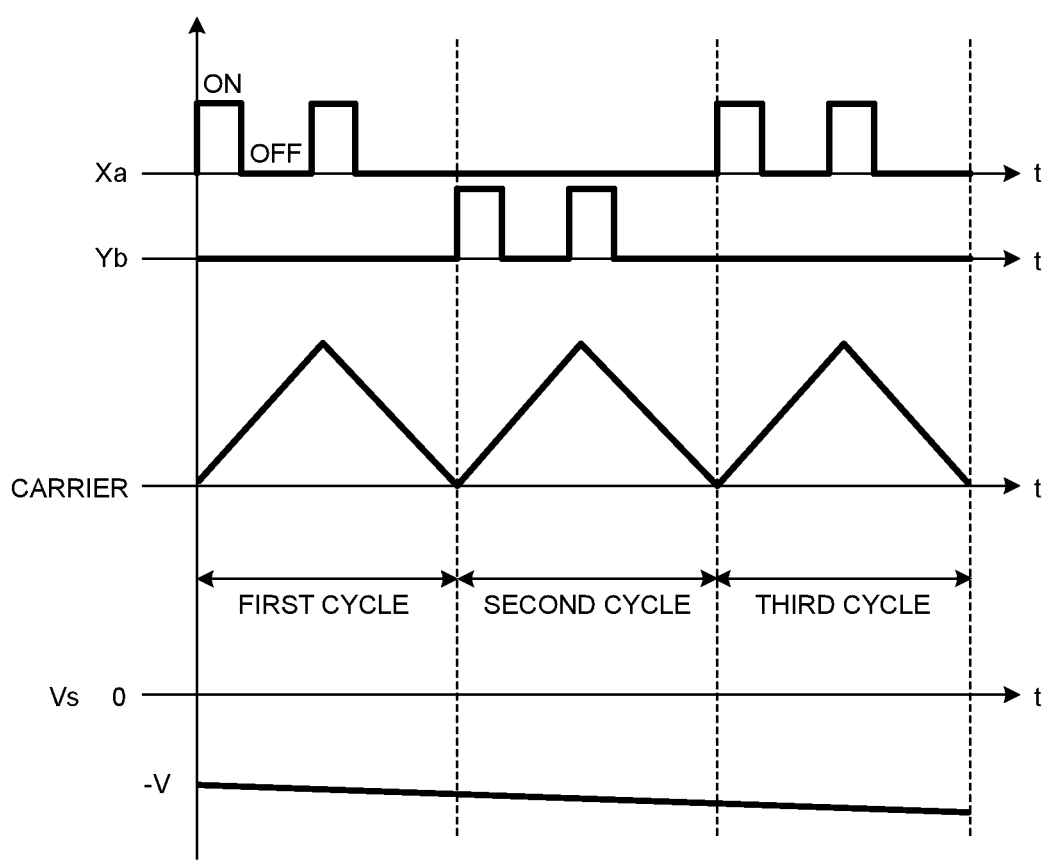
FIG. 11 is a second time chart for explaining the operation of the drive pulse generation unit in the second embodiment.
Figure 12:
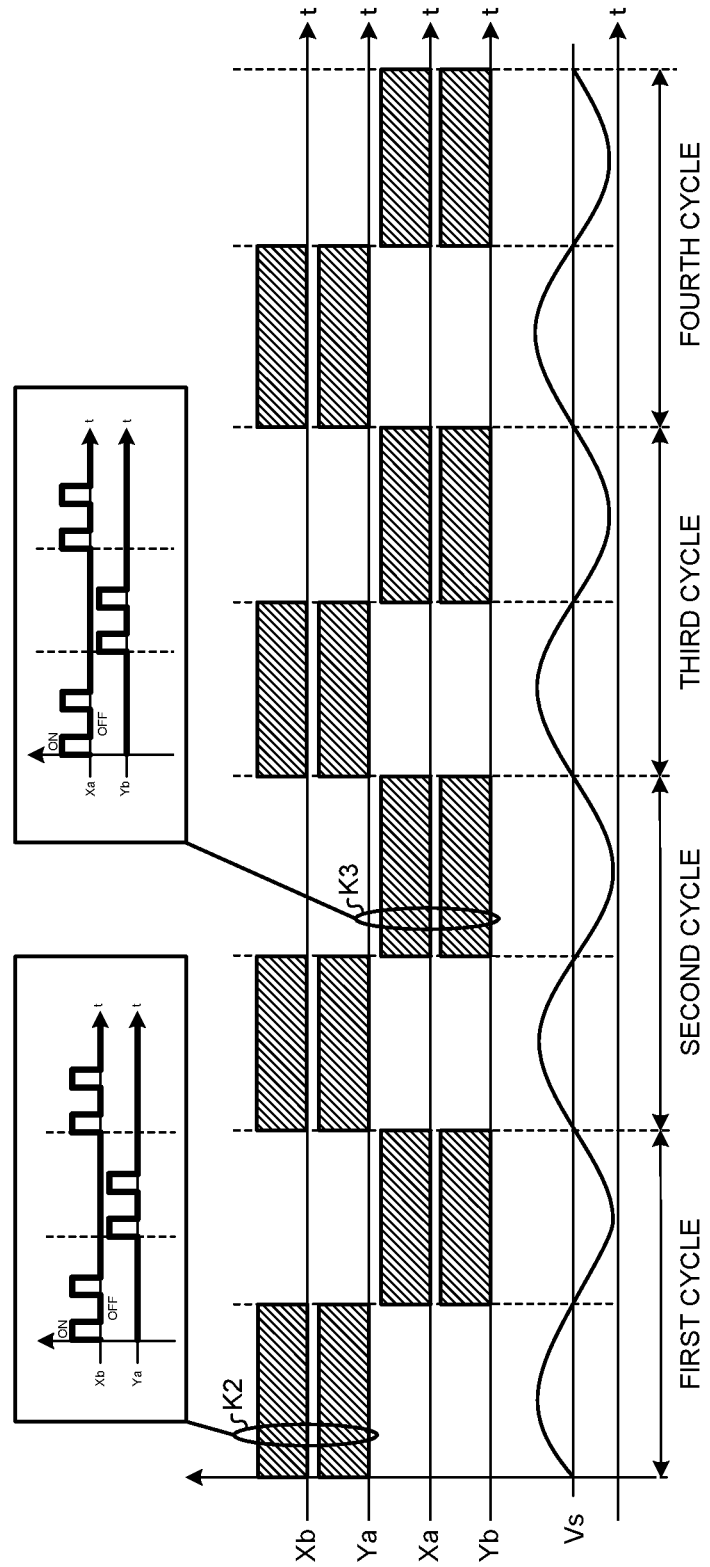
FIG. 12 is a third time chart with a longer time span for explaining the operation of the drive pulse generation unit in the second embodiment.

FIG. 10 is a first time chart for explaining the operation of the drive pulse generation unit 24 in the second embodiment. FIG. 11 is a second time chart for explaining the operation of the drive pulse generation unit 24 in the second embodiment. FIG. 12 is a third time chart with a longer time span for explaining the operation of the drive pulse generation unit 24 in the second embodiment.

FIG. 10 depicts waveforms for the case that the power supply voltage Vs is positive. In order from the upper side, the waveforms of the second drive pulse Xb for driving the first lower-arm element 312, the third drive pulse Ya for driving the second upper-arm element 321, the carrier, and the power supply voltage Vs are illustrated.

FIG. 11 depicts waveforms for the case that the power supply voltage Vs is negative. In order from the upper side, the waveforms of the first drive pulse Xa for driving the first upper-arm element 311, the fourth drive pulse Yb for driving the second lower-arm element 322, the carrier, and the power supply voltage Vs are illustrated.

FIGS. 10 and 11 illustrate examples in which the carrier is a triangle wave. Assuming that the carrier cycle is T and the carrier frequency is f, an example of the carrier frequency f is 10 kHz. When the carrier frequency f is 10 kHz, the carrier cycle T is 100 μs.

In FIG. 10, in the first carrier cycle, the second upper-arm element 321 is controlled to be OFF and the first lower-arm element 312 is controlled for boosting operation. In the boosting operation, the ON state and the OFF state are repeated twice. Note that the first upper-arm element 311 and the second lower-arm element 322 are controlled to be always OFF. For this reason, the drive pulses for these arm elements are not illustrated in FIG. 10.

In FIG. 10, a first pulse a1 of the second drive pulse Xb can be generated based on the trough of the carrier. The width of the first pulse a1, that is, the ON time of the first pulse a1, can be set to any time shorter than a half carrier cycle. A second pulse a2 of the second drive pulse Xb can be generated using the time that elapses after the first pulse a1 falls. The switching from the ON or OFF state of the second drive pulse Xb to the third drive pulse Ya can also be performed based on the trough of the carrier. Other drive pulses described below can also be generated in the same manner as the second drive pulse Xb.

As illustrated in the drawing, the first lower-arm element 312 is repeatedly turned ON and OFF. The ON state is the operation in the power supply short-circuit mode illustrated in FIG. 2. The OFF state is the operation in the charging mode illustrated in FIG. 4.

In the second cycle of the carrier, the first lower-arm element 312 is controlled to be OFF and the second upper-arm element 321 is controlled for boosting operation. As illustrated in the drawing, the second upper-arm element 321 is repeatedly turned ON and OFF. The ON state is the operation in the power supply short-circuit mode illustrated in FIG. 6. The OFF state is the operation in the charging mode illustrated in FIG. 4.

The third cycle of the carrier has the same operation as the first cycle of the carrier. The fourth cycle of the carrier has the same operation as the second cycle of the carrier (not illustrated).

In FIG. 11, in the first carrier cycle, the second lower-arm element 322 is controlled to be OFF and the first upper-arm element 311 is controlled for boosting operation. In the boosting operation, the ON state and the OFF state are repeated twice. Note that the first lower-arm element 312 and the second upper-arm element 321 are controlled to be always OFF. For this reason, the drive pulses for these arm elements are not illustrated in FIG. 11.

As illustrated in the drawing, the first upper-arm element 311 is repeatedly turned ON and OFF. The ON state is the operation in the power supply short-circuit mode illustrated in FIG. 3. The OFF state is the operation in the charging mode illustrated in FIG. 5.

In the second cycle of the carrier, the first upper-arm element 311 is controlled to be OFF and the second lower-arm element 322 is controlled for boosting operation. As illustrated in the drawing, the second lower-arm element 322 is repeatedly turned ON and OFF. The ON state is the operation in the power supply short-circuit mode illustrated in FIG. 7. The OFF state is the operation in the charging mode illustrated in FIG. 5.

The third cycle of the carrier has the same operation as the first cycle of the carrier. The fourth cycle of the carrier has the same operation as the second cycle of the carrier (not illustrated).

FIG. 12, which has a longer time span than FIGS. 10 and 11, depicts the waveforms corresponding to four power supply cycles. In order from the upper side, the waveforms of the second drive pulse Xb for driving the first lower-arm element 312, the third drive pulse Ya for driving the second upper-arm element 321, the first drive pulse Xa for driving the first upper-arm element 311, the fourth drive pulse Yb for driving the second lower-arm element 322, and the power supply voltage Vs are illustrated.

In FIG. 12, the enlargement of K2 surrounded by an ellipse shows the waveforms of the second drive pulse Xb and the third drive pulse Ya illustrated in the time chart of FIG. 10. The enlargement of the waveform of K3 surrounded by an ellipse shows the waveforms of the first drive pulse Xa and the fourth drive pulse Yb illustrated in the time chart of FIG. 11.

As apparent from FIGS. 10, 11, and 12, the first upper-arm element 311, the first lower-arm element 312, the second upper-arm element 321, and the second lower-arm element 322 operate equally and evenly. As a result, these arm elements generate heat uniformly, avoiding the situation in which heat generation concentrates on a specific switching element. Therefore, the problem of an increase in the size of a heat sink for cooling a specific switching element is solved. In addition, measures such as securing an air path for cooling and securing a distance to a heat-sensitive component are unnecessary. This solves the problem of an increase in the size and cost of the apparatus.

Although two ON drive pulses are generated in one carrier cycle in FIGS. 10 and 11, the number of ON drive pulses is not limited to two. The number of ON drive pulses may be one or may be three or more.

Figure 13:
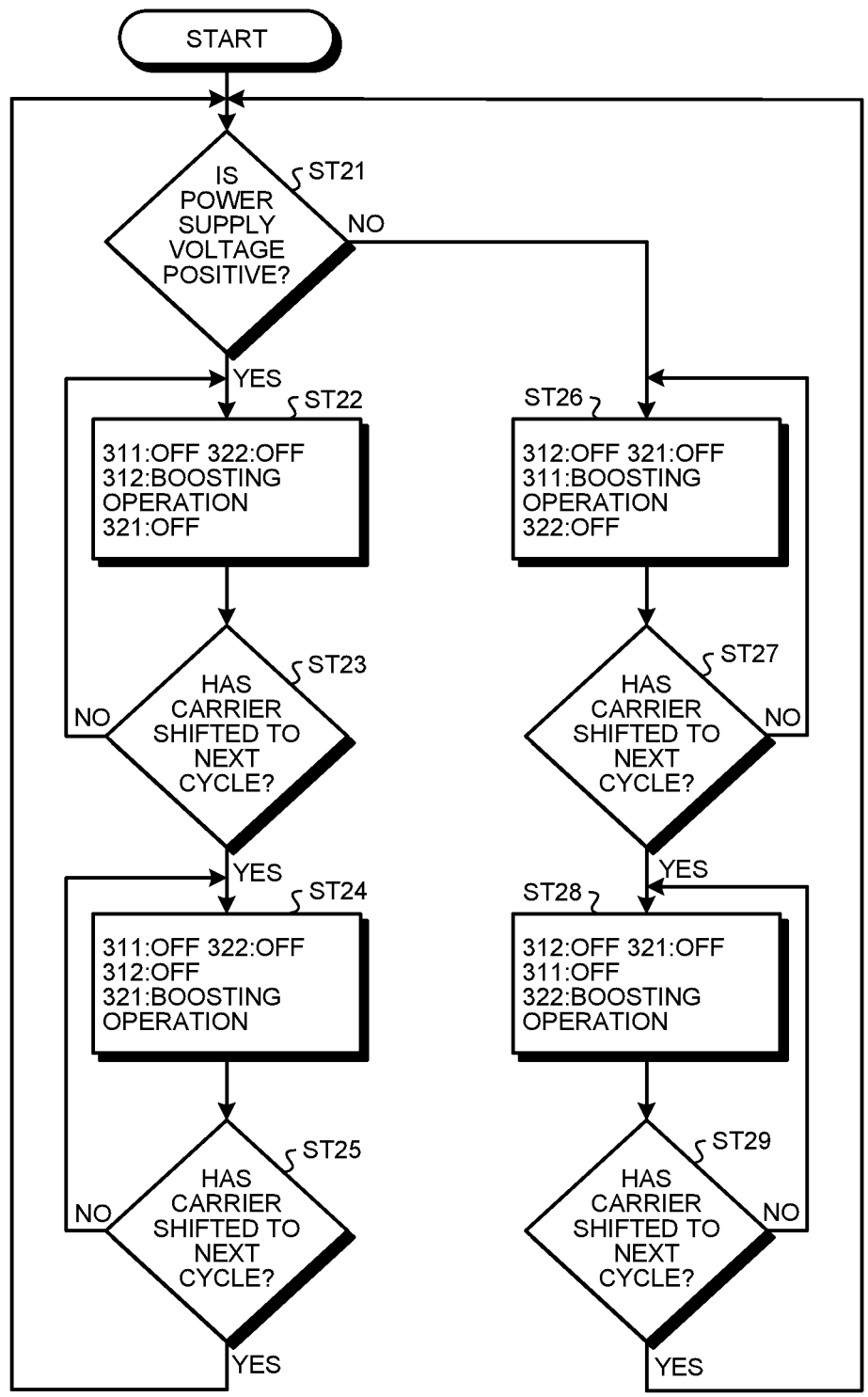
FIG. 13 is a flowchart illustrating the operation of the drive pulse generation unit in the second embodiment.

Next, the procedure for control of the AC-DC converting apparatus according to the second embodiment will be described. FIG. 13 is a flowchart illustrating the operation of the drive pulse generation unit 24 in the second embodiment.

In step ST21, it is determined whether the power supply voltage is positive. If the power supply voltage is positive (Yes in step ST21), the process proceeds to step ST22.

In step ST22, the first upper-arm element 311, the second upper-arm element 321, and the second lower-arm element 322 are controlled to be OFF. On the other hand, the first lower-arm element 312 is controlled for boosting operation. When step ST22 ends, the process proceeds to step ST23.

In step ST23, it is determined whether the carrier has shifted to the next cycle. Whether the carrier has shifted to the next cycle can be detected by sensing a change in the carrier waveform.

In step ST23, if the carrier has not shifted to the next cycle (No in step ST23), step ST22 is repeated. On the other hand, if the carrier has shifted to the next cycle (Yes in step ST23), the process proceeds to step ST24.

In step ST24, the first upper-arm element 311, the first lower-arm element 312, and the second lower-arm element 322 are controlled to be OFF. On the other hand, the second upper-arm element 321 is controlled for boosting operation. When step ST24 ends, the process proceeds to step ST25.

In step ST25, it is determined whether the carrier has shifted to the next cycle. In step ST25, if the carrier has not shifted to the next cycle (No in step ST25), step ST24 is repeated. On the other hand, if the carrier has shifted to the next cycle (Yes in step ST25), the process returns to step ST21.

In step ST21, if the power supply voltage is negative (No in step ST21), the process proceeds to step ST26. In step ST26, the first lower-arm element 312, the second upper-arm element 321, and the second lower-arm element 322 are controlled to be OFF. On the other hand, the first upper-arm element 311 is controlled for boosting operation. When step ST26 ends, the process proceeds to step ST27.

In step ST27, it is determined whether the carrier has shifted to the next cycle. In step ST27, if the carrier has not shifted to the next cycle (No in step ST27), step ST26 is repeated. On the other hand, if the carrier has shifted to the next cycle (Yes in step ST27), the process proceeds to step ST28.

In step ST28, the first upper-arm element 311, the first lower-arm element 312, and the second upper-arm element 321 are controlled to be OFF. On the other hand, the second lower-arm element 322 is controlled for boosting operation. When step ST28 ends, the process proceeds to step ST29.

In step ST29, it is determined whether the carrier has shifted to the next cycle. In step ST29, if the carrier has not shifted to the next cycle (No in step ST29), step ST28 is repeated. On the other hand, if the carrier has shifted to the next cycle (Yes in step ST29), the process returns to step ST21. Subsequently, steps ST21 to ST29 described above are repeated.

As described above, in the second embodiment, when the power supply voltage is positive, switching is performed such that the first lower-arm element 312 and the second upper-arm element 321 located at diagonal positions on the circuit diagram are caused to perform boosting operation alternately.

As described above, in the second embodiment, when the power supply voltage is negative, switching is performed such that the first upper-arm element 311 and the second lower-arm element 322 located at diagonal positions on the circuit diagram are caused to perform boosting operation alternately.

Owing to the above-described operation, in the AC-DC converting apparatus according to the second embodiment, all the arm elements constituting the boost circuit 3, namely the first upper-arm element 311, the first lower-arm element 312, the second upper-arm element 321, and the second lower-arm element 322, operate equally, whereby the concentration of heat generation on a specific arm element can be avoided. This makes it possible to prevent an increase in the size and cost of the apparatus.

Further, in the AC-DC converting apparatus according to the second embodiment, the arm element to be caused to perform boosting operation is switched on a carrier cycle basis, where the carrier cycle is shorter than the power supply cycle. Therefore, the AC-DC converting apparatus according to the second embodiment is more effective in equalizing heat generation between the switching elements than that according to the first embodiment.

Third Embodiment

In a third embodiment, an embodiment in which synchronous rectification is applied to the AC-DC converting apparatus according to the first embodiment will be described. Synchronous rectification is the control of turning ON the switching element connected in antiparallel to a rectifying diode when a current flows through the rectifying diode.

First, the synchronous rectification operation in the third embodiment will be described with reference to FIGS. 14 to 19. Note that the configuration of the AC-DC converting apparatus according to the third embodiment is the same as that illustrated in FIG. 1.

Figure 14:
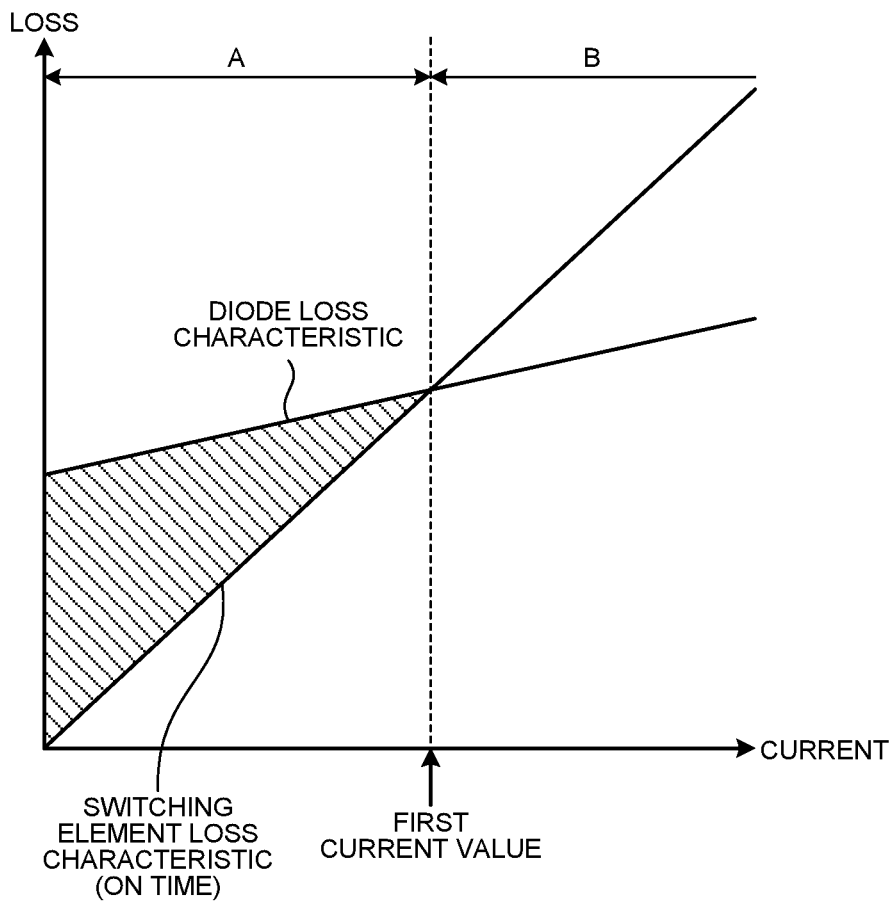
FIG. 14 is a diagram schematically illustrating the current-loss characteristics of a typical switching element.

FIG. 14 is a diagram schematically illustrating the current-loss characteristics of a typical switching element. In FIG. 14, the loss characteristic of the parasitic diode and the on-time loss characteristic of the switching element are illustrated. In FIG. 14, the current value at which the loss value of the loss characteristic of the parasitic diode and the loss value of the loss characteristic of the switching element are reversed is defined as the first current value. When the current value is smaller than the first current value, the loss characteristic of the switching element is smaller than the loss characteristic of the parasitic diode, and this region is referred to as "low current region A". When the current value is larger than the first current value, the loss characteristic of the parasitic diode is smaller than the loss characteristic of the switching element, and this region is referred to as "high current region B". Note that the first current value is held inside a computing element or in a memory readable by a computing element.

As described above, it is known that, in low current region A, the loss that occurs at the parasitic diode of a typical switching element is larger than the loss that occurs when the switching element is ON, as illustrated in FIG. 14. Note that the characteristics illustrated in FIG. 14 hold even when the parasitic diode is replaced by a diode.

In a case where switching elements are MOSFETs, a synchronous rectification technique that is based on switching characteristics can be used. The switching characteristics as used herein mean that when an on command is given to the gate of a MOSFET, the switching element is in the on state in both the direction from the drain to the source and the direction from the source to the drain, that is, current can flow through the switching element in both directions.

The switching characteristics are unique because other types of switching elements such as bipolar transistors and IGBTs can conduct current only in one direction. Utilizing the switching characteristics, the diode or parasitic diode is not used in low current region A illustrated in FIG. 14 so that the switching element conducts current, whereby higher efficiency can be achieved than when the diode or parasitic diode is used.

Figure 15:
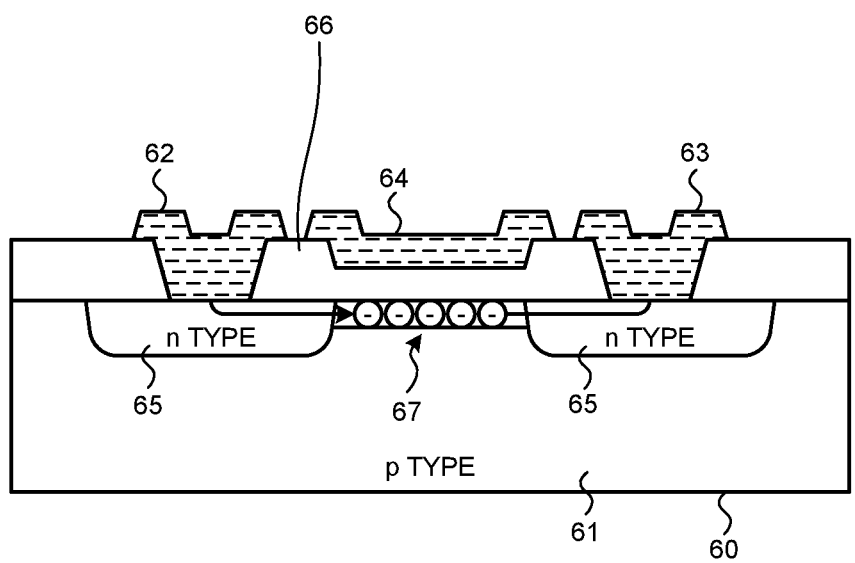
FIG. 15 is a schematic cross-sectional diagram illustrating a schematic structure of a MOSFET.

FIG. 15 is a schematic cross-sectional diagram illustrating a schematic structure of a MOSFET. In FIG. 15, an n-type MOSFET is illustrated.

In the case of the n-type MOSFET, a p-type semiconductor substrate 60 is used as illustrated in FIG. 15. A source electrode 62, a drain electrode 63, and a gate electrode 64 are formed on the semiconductor substrate 60 including a p-type region 61. High-concentration impurities are ion-implanted into the contacts with the source electrode 62 and the drain electrode 63 to form n-type regions 65. On the p-type semiconductor substrate 60, an oxide insulating film 66 is formed between a portion without the n-type regions 65 and the gate electrode 64. That is, the oxide insulating film 66 is interposed between the gate electrode 64 and the p-type region 61 of the semiconductor substrate 60.

When a positive voltage is applied to the gate electrode 64, electrons are attracted to the interface between the p-type region 61 of the semiconductor substrate 60 and the oxide insulating film 66, and are negatively charged. In the place where electrons gather, the density of electrons is greater than that of holes. Therefore, this place becomes n-type. This n-type portion serves as a current path that is called a channel. FIG. 15 is an example in which an n-type channel 67 is formed. In the case of a p-type MOSFET, a p-type channel is formed.

When synchronous rectification is performed, since a MOSFET is controlled to be on, the flow of current through the channel side is larger than the flow of current through the diode or parasitic diode side.

Figure 16:
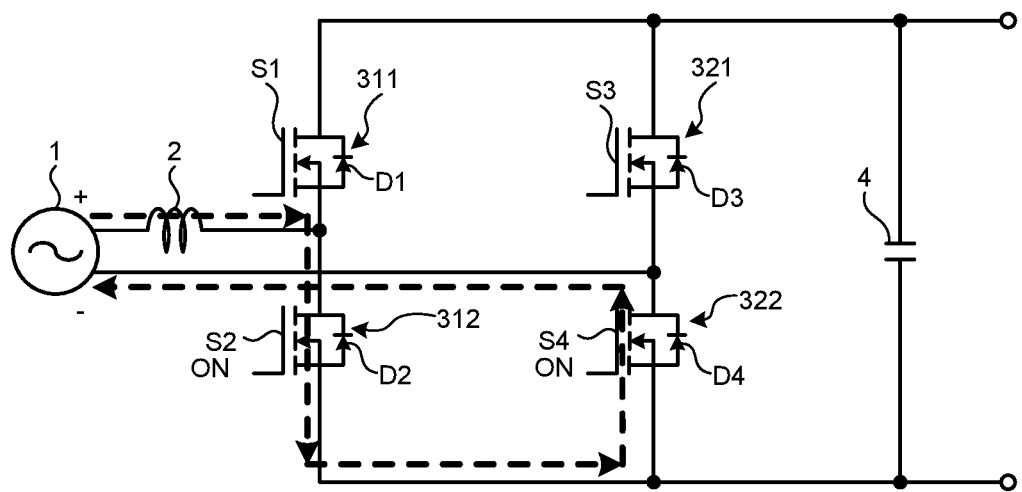
FIG. 16 is a diagram illustrating a short-circuit path for the alternating-current power supply through the reactor for the case that the power supply voltage is positive and synchronous rectification is performed.
Figure 17:
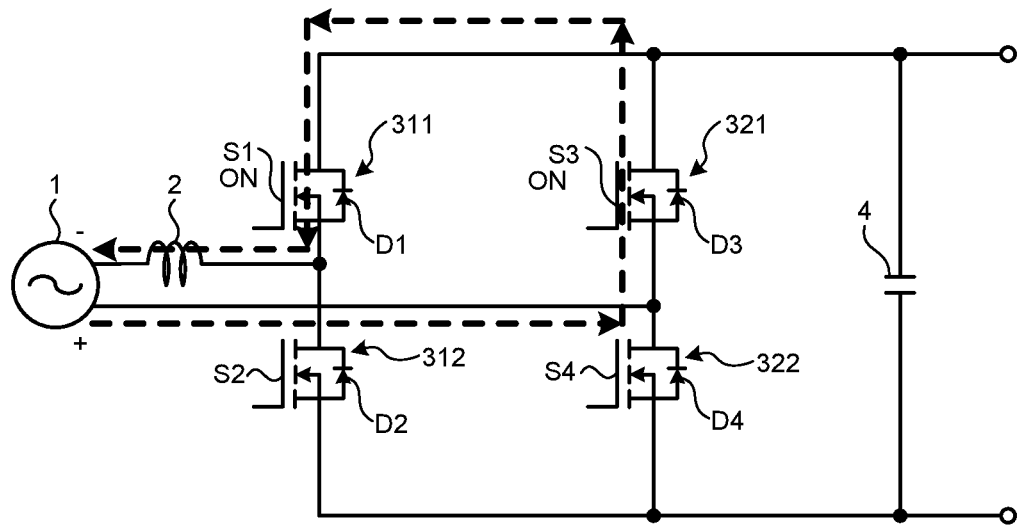
FIG. 17 is a diagram illustrating a short-circuit path for the alternating-current power supply through the reactor for the case that the power supply voltage is negative and synchronous rectification is performed.
Figure 18:
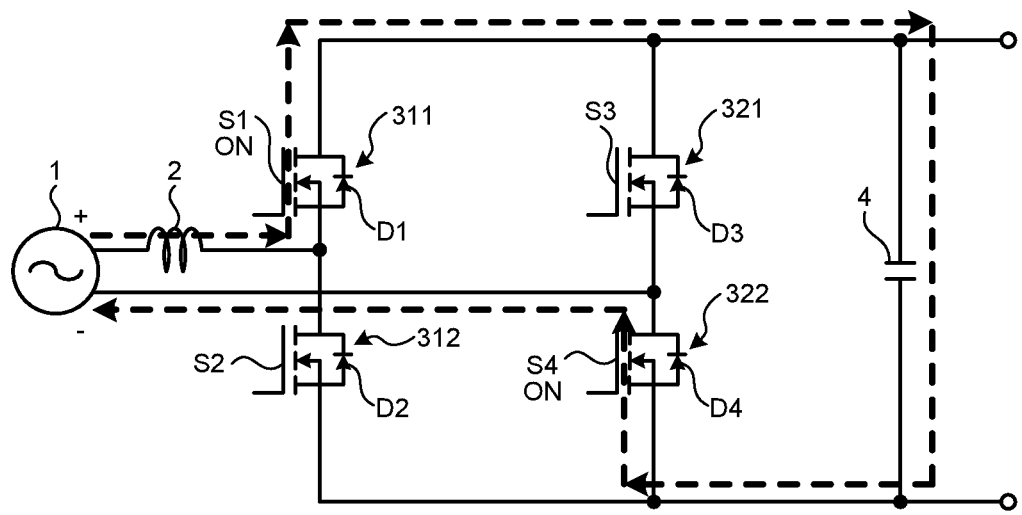
FIG. 18 is a diagram illustrating a charging path for the smoothing capacitor for the case that the power supply voltage is positive and synchronous rectification is performed.
Figure 19:
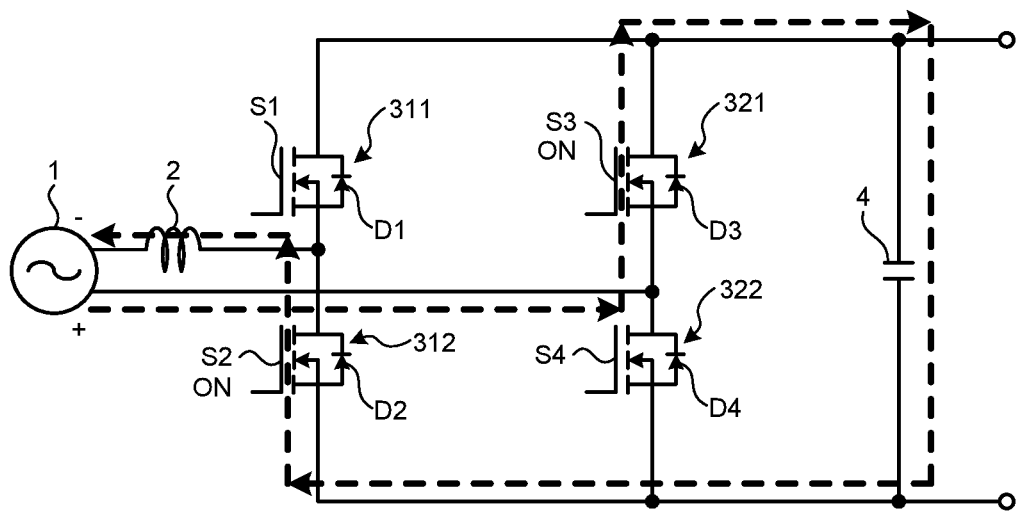
FIG. 19 is a diagram illustrating a charging path for the smoothing capacitor for the case that the power supply voltage is negative and synchronous rectification is performed.

FIGS. 16 and 17 are diagrams each illustrating a short-circuit path for the alternating-current power supply 1 through the reactor 2 for the case that synchronous rectification is performed. The difference between the two is that the power supply voltage in FIG. 16 is positive and the power supply voltage in FIG. 17 is negative. FIGS. 18 and 19 are diagrams each illustrating a charging path for the smoothing capacitor 4 for the case that synchronous rectification is performed. The difference between the two is that the power supply voltage in FIG. 18 is positive and the power supply voltage in FIG. 19 is negative.

FIGS. 2 and 3 depict short-circuit paths for the alternating-current power supply 1 through the reactor 2 for the case that synchronous rectification is not performed. When the power supply voltage is short-circuited through the reactor 2, in FIG. 2, since the second lower-arm element 322 is not controlled to be ON and is kept OFF, a short-circuit current flows through the diode D4.

On the other hand, in FIG. 16, when the power supply voltage is short-circuited through the reactor 2, the second lower-arm element 322 is controlled to be ON, so that a current flows through the channel of the switching element S4 of the second lower-arm element 322. In the power supply short-circuit mode, since the reactor 2 is present in the short-circuit path, the magnitude of the short-circuit current flowing through the short-circuit path is suppressed by the reactor 2. For this reason, FIG. 16 in which the switching element S4 of the second lower-arm element 322 is controlled to be ON so that a current flows through the channel side has lower loss than FIG. 2 in which a current flows through the diode D4 of the second lower-arm element 322.

Similarly, in FIG. 3, since the second upper-arm element 321 is not controlled to be ON and is kept OFF, a short-circuit current flows through the diode D3. On the other hand, in FIG. 17, when the power supply voltage is short-circuited through the reactor 2, the second upper-arm element 321 is controlled to be ON, so that a current flows through the channel of the switching element S3 of the second upper-arm element 321. In the power supply short-circuit mode, since the reactor 2 is present in the short-circuit path, the magnitude of the short-circuit current flowing through the short-circuit path is suppressed by the reactor 2. For this reason, FIG. 17 in which the switching element S3 of the second upper-arm element 321 is controlled to be ON so that a current flows through the channel side has lower loss than FIG. 3 in which a current flows through the diode D3 of the second upper-arm element 321.

FIGS. 4 and 5 depict charging paths for the smoothing capacitor 4 for the case that synchronous rectification is not performed. When the smoothing capacitor 4 is charged, in FIG. 4, the first upper-arm element 311 and the second lower-arm element 322 are not controlled to be ON and are kept OFF. As a result, a charging current flows through the diode D1 of the first upper-arm element 311 and the diode D4 of the second lower-arm element 322.

On the other hand, in FIG. 18, when the smoothing capacitor 4 is charged, the first upper-arm element 311 and the second lower-arm element 322 are controlled to be ON, so that a current flows through each channel of the switching element S1 of the first upper-arm element 311 and the switching element S4 of the second lower-arm element 322. The charging current is not so large, except in the case of initial charge. For this reason, FIG. 18 in which the switching element S1 of the first upper-arm element 311 and the switching element S4 of the second lower-arm element 322 are controlled to be ON so that a current flows through each channel has lower loss than FIG. 4 in which a current flows through the diode D1 of the first upper-arm element 311 and the diode D4 of the second lower-arm element 322.

Similarly, in FIG. 5, the first lower-arm element 312 and the second upper-arm element 321 are not controlled to be ON and are kept OFF. As a result, a charging current flows through the diode D2 of the first lower-arm element 312 and the diode D3 of the second upper-arm element 321.

On the other hand, in FIG. 19, when the smoothing capacitor 4 is charged, the first lower-arm element 312 and the second upper-arm element 321 are controlled to be ON, so that a current flows through each channel of the switching element S2 of the first lower-arm element 312 and the switching element S3 of the second upper-arm element 321. The charging current is not so large, except in the case of initial charge. For this reason, FIG. 19 in which the switching element S2 of the first lower-arm element 312 and the switching element S3 of the second upper-arm element 321 are controlled to be ON so that a current flows through each channel has lower loss than FIG. 5 in which a current flows through the diode D2 of the first lower-arm element 312 and the diode D3 of the second upper-arm element 321.

By applying synchronous rectification as described above, it is possible to drive the AC-DC converting apparatus 100 with low loss. Synchronous rectification can be implemented by the function of the control unit 10.

Figure 20:
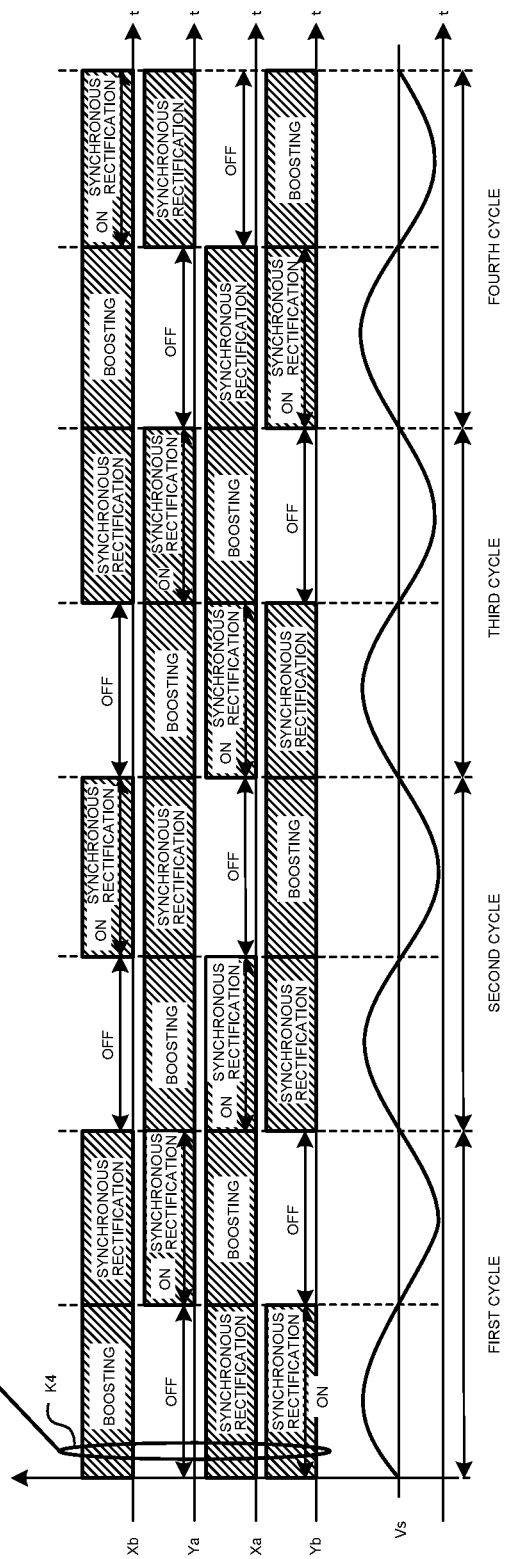
FIG. 20 is a time chart for explaining the operation of a drive pulse generation unit in a third embodiment.

Next, the operation of the AC-DC converting apparatus according to the third embodiment will be described. FIG. 20 is a time chart for explaining the operation of the drive pulse generation unit in the third embodiment.

In FIG. 20, when the power supply voltage Vs is positive in the first cycle of the power supply voltage Vs, the second upper-arm element 321 is controlled to be OFF, the first lower-arm element 312 is controlled for boosting operation, the first upper-arm element 311 is subjected to switching control for synchronous rectification, and the second lower-arm element 322 is controlled to be always ON for synchronous rectification. FIG. 20 depicts enlarged waveforms of K4 surrounded by an ellipse. In the waveforms of K4, the state in which the first lower-arm element 312 is ON is the operation in the power supply short-circuit mode illustrated in FIG. 16. The state in which the first lower-arm element 312 is OFF is the operation in the charging mode illustrated in FIG. 18.

When the power supply voltage Vs is negative in the first cycle of the power supply voltage Vs, the second lower-arm element 322 is controlled to be OFF, the first upper-arm element 311 is controlled for boosting operation, the first lower-arm element 312 is subjected to switching control for synchronous rectification, and the second upper-arm element 321 is controlled to be always ON for synchronous rectification. Although enlarged waveforms are not illustrated, in comparison with the case in which the power supply voltage Vs is positive in the first cycle of the power supply voltage Vs, the waveforms of the first upper-arm element 311 and the first lower-arm element 312 are reversed and the waveforms of the second upper-arm element 321 and the second lower-arm element 322 are reversed. The state in which the first upper-arm element 311 is ON is the operation in the power supply short-circuit mode illustrated in FIG. 17. The state in which the first upper-arm element 311 is OFF is the operation in the charging mode illustrated in FIG. 19.

When the power supply voltage Vs is positive in the second cycle of the power supply voltage Vs, the first lower-arm element 312 is controlled to be OFF, the second upper-arm element 321 is controlled for boosting operation, the second lower-arm element 322 is subjected to switching control for synchronous rectification, and the first upper-arm element 311 is controlled to be always ON for synchronous rectification. Although enlarged waveforms are not illustrated, in comparison with the case in which the power supply voltage Vs is positive in the first cycle of the power supply voltage Vs, the waveforms of the first upper-arm element 311 and the second lower-arm element 322 are reversed and the waveforms of the first lower-arm element 312 and the second upper-arm element 321 are reversed. The state in which the second upper-arm element 321 is ON is the operation in the power supply short-circuit mode, and the state in which the second upper-arm element 321 is OFF is the operation in the charging mode (not illustrated).

When the power supply voltage Vs is negative in the second cycle of the power supply voltage Vs, the first upper-arm element 311 is controlled to be OFF, the second lower-arm element 322 is controlled for boosting operation, the second upper-arm element 321 is subjected to switching control for synchronous rectification, and the first lower-arm element 312 is controlled to be always ON for synchronous rectification. Although enlarged waveforms are not illustrated, in comparison with the case in which the power supply voltage Vs is negative in the first cycle of the power supply voltage Vs, the waveforms of the first upper-arm element 311 and the second lower-arm element 322 are reversed and the waveforms of the first lower-arm element 312 and the second upper-arm element 321 are reversed. The state in which the second lower-arm element 322 is ON is the operation in the power supply short-circuit mode, and the state in which the second lower-arm element 322 is OFF is the operation in the charging mode (not illustrated).

In and after the third cycle of the power supply voltage Vs, either the drive pulse of the first cycle or the drive pulse of the second cycle is repeated one by one. In FIG. 20, when the power supply voltage Vs is positive, the drive pulse of the second cycle is selected in the third cycle and the drive pulse of the first cycle is selected in the fourth cycle. When the power supply voltage Vs is negative, the drive pulse of the first cycle is selected in the third cycle and the drive pulse of the second cycle is selected in the fourth cycle. Instead of the example in FIG. 20, when the power supply voltage Vs is positive, the drive pulse of the first cycle may be selected in the third cycle and the drive pulse of the second cycle may be selected in the fourth cycle. When the power supply voltage Vs is negative, the drive pulse of the second cycle may be selected in the third cycle and the drive pulse of the first cycle may be selected in the fourth cycle. That is, drive pulses may be freely selected as long as each drive pulse appears once in a period twice as long as one cycle of the power supply voltage Vs.

Regarding the control procedure, the flowchart illustrated in FIG. 9 can be used. This can be achieved simply by replacing steps ST13, ST14, ST16, and ST17 with the above-mentioned process of generating drive pulses.

As apparent from FIG. 20, the first upper-arm element 311, the first lower-arm element 312, the second upper-arm element 321, and the second lower-arm element 322 operate equally and evenly. As a result, these arm elements generate heat uniformly, avoiding the situation in which heat generation concentrates on a specific switching element. Therefore, the problem of an increase in the size of a heat sink for cooling a specific switching element is solved. In addition, measures such as securing an air path for cooling and securing a distance to a heat-sensitive component are unnecessary. This solves the problem of an increase in the size and cost of the apparatus.

Owing to the above-described operation, in the AC-DC converting apparatus according to the third embodiment, all the arm elements constituting the boost circuit 3, namely the first upper-arm element 311, the first lower-arm element 312, the second upper-arm element 321, and the second lower-arm element 322, operate equally, whereby the concentration of heat generation on a specific arm element can be avoided. This makes it possible to prevent an increase in the size and cost of the apparatus.

Further, since synchronous rectification is applied to the AC-DC converting apparatus according to the third embodiment, it is possible to drive the AC-DC converting apparatus with low loss.

Fourth Embodiment

In a fourth embodiment, an embodiment in which synchronous rectification is applied to the AC-DC converting apparatus according to the second embodiment will be described. Note that the configuration of the AC-DC converting apparatus according to the fourth embodiment is the same as that illustrated in FIG. 1.

Figure 21:
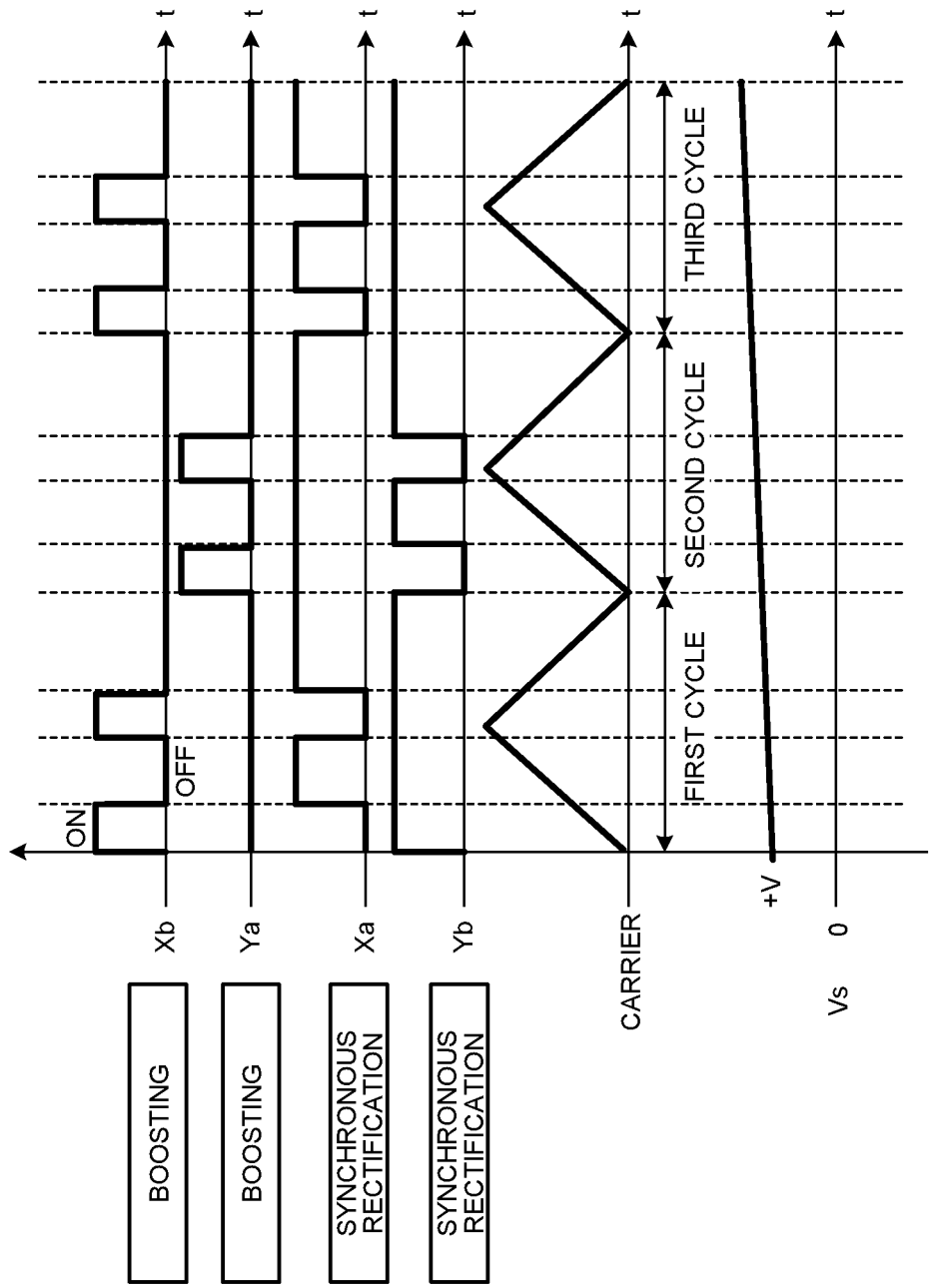
FIG. 21 is a first time chart for explaining the operation of a drive pulse generation unit in a fourth embodiment.
Figure 22:
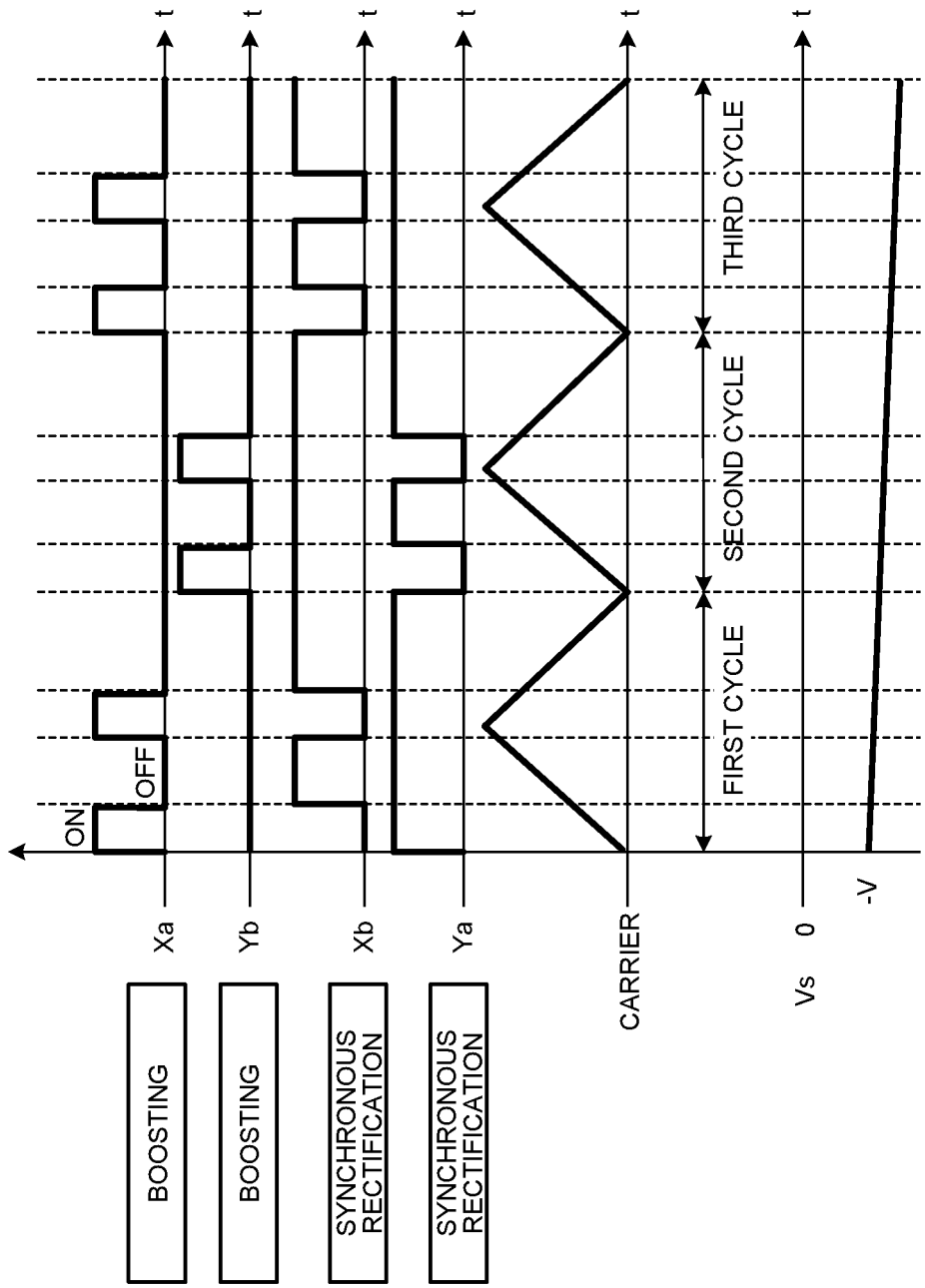
FIG. 22 is a second time chart for explaining the operation of the drive pulse generation unit in the fourth embodiment.
Figure 23:
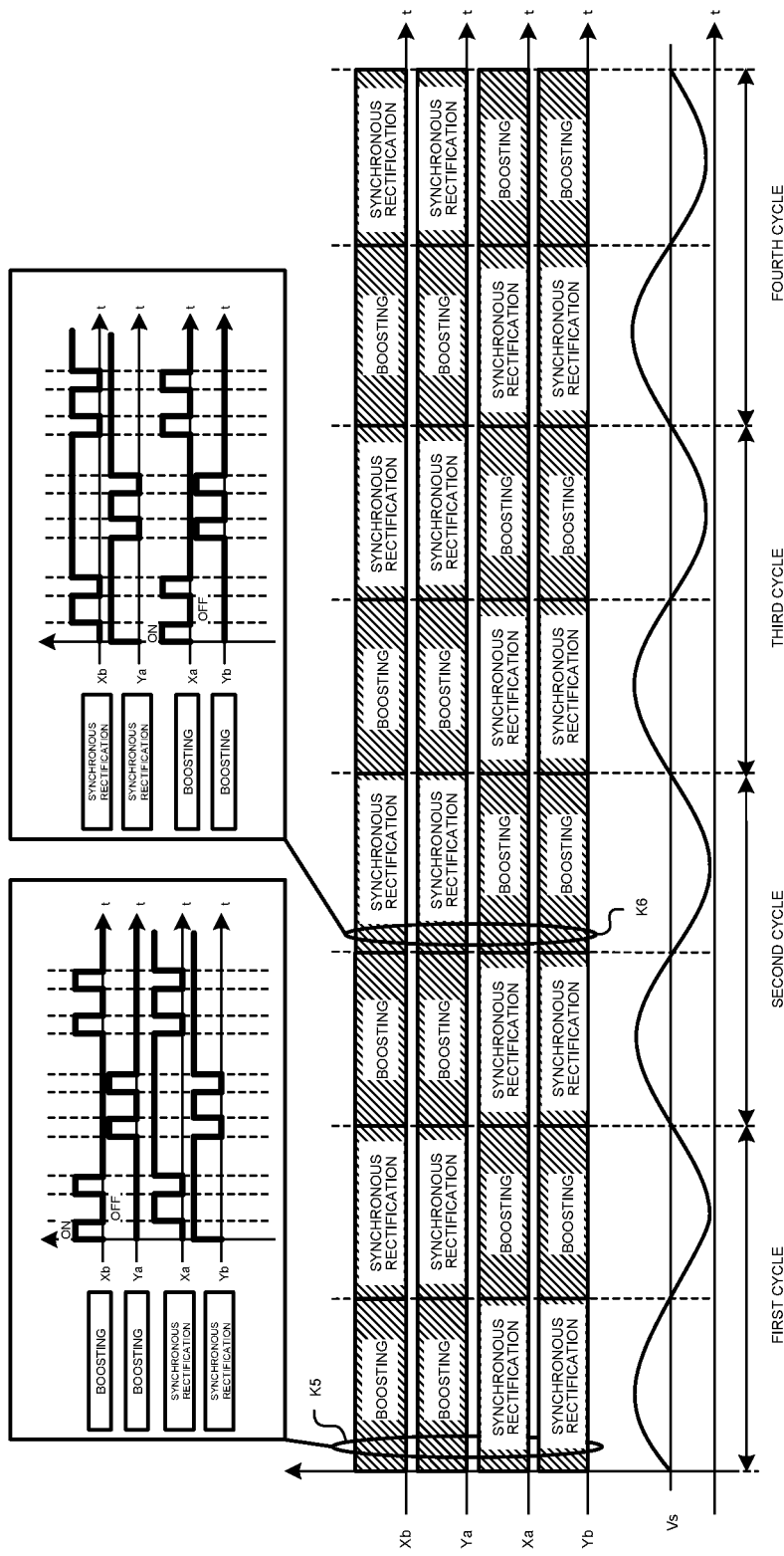
FIG. 23 is a third time chart with a longer time span for explaining the operation of the drive pulse generation unit in the fourth embodiment.

FIG. 21 is a first time chart for explaining the operation of the drive pulse generation unit 24 in the fourth embodiment. FIG. 22 is a second time chart for explaining the operation of the drive pulse generation unit 24 in the fourth embodiment. FIG. 23 is a third time chart with a longer time span for explaining the operation of the drive pulse generation unit 24 in the fourth embodiment.

FIG. 21 depicts waveforms for the case that the power supply voltage Vs is positive. In order from the upper side, the waveforms of the second drive pulse Xb for driving the first lower-arm element 312, the third drive pulse Ya for driving the second upper-arm element 321, the first drive pulse Xa for driving the first upper-arm element 311, the fourth drive pulse Yb for driving the second lower-arm element 322, the carrier, and the power supply voltage Vs are illustrated.

FIG. 22 depicts waveforms for the case that the power supply voltage Vs is negative. In order from the upper side, the waveforms of the first drive pulse Xa for driving the first upper-arm element 311, the fourth drive pulse Yb for driving the second lower-arm element 322, the second drive pulse Xb for driving the first lower-arm element 312, the third drive pulse Ya for driving the second upper-arm element 321, the carrier, and the power supply voltage Vs are illustrated.

FIGS. 21 and 22 illustrate examples in which the carrier is a triangle wave. Assuming that the carrier cycle is T and the carrier frequency is f, an example of the carrier frequency f is 10 kHz. When the carrier frequency f is 10 kHz, the carrier cycle T is 100 µs.

In FIG. 21, in the first carrier cycle, the second upper-arm element 321 is controlled to be OFF and the first lower-arm element 312 is controlled for boosting operation. In the boosting operation, the ON state and the OFF state are repeated twice. The first upper-arm element 311 is subjected to switching control for synchronous rectification, and the second lower-arm element 322 is controlled to be always ON for synchronous rectification. The first upper-arm element 311 is ON during the OFF period of the first lower-arm element 312 so that the first upper-arm element 311 and the first lower-arm element 312 are not simultaneously ON.

As illustrated in the drawing, the first lower-arm element 312 is repeatedly turned ON and OFF. The ON state is the operation in the power supply short-circuit mode illustrated in FIG. 16. The OFF state is the operation in the charging mode illustrated in FIG. 18.

In the second cycle of the carrier, the first lower-arm element 312 is controlled to be OFF and the second upper-arm element 321 is controlled for boosting operation. In the boosting operation, the ON state and the OFF state are repeated twice. The second lower-arm element 322 is subjected to switching control for synchronous rectification and the first upper-arm element 311 is controlled to be always ON for synchronous rectification. The second lower-arm element 322 is ON during the OFF period of the second upper-arm element 321 so that the second lower-arm element 322 and the second upper-arm element 321 are not simultaneously ON.

As illustrated in the drawing, the second upper-arm element 321 is repeatedly turned ON and OFF. The ON state is the operation in the power supply short-circuit mode (not illustrated). The OFF state is the operation in the charging mode illustrated in FIG. 18.

The third cycle of the carrier has the same operation as the first cycle of the carrier. The fourth cycle of the carrier has the same operation as the second cycle of the carrier (not illustrated).

In FIG. 22, in the first carrier cycle, the second lower-arm element 322 is controlled to be OFF and the first upper-arm element 311 is controlled for boosting operation. In the boosting operation, the ON state and the OFF state are repeated twice. The first lower-arm element 312 is subjected to switching control for synchronous rectification and the second upper-arm element 321 is controlled to be always ON for synchronous rectification. The first lower-arm element 312 is ON during the OFF period of the first upper-arm element 311 so that the first upper-arm element 311 and the first lower-arm element 312 are not simultaneously ON.

As illustrated in the drawing, the first upper-arm element 311 is repeatedly turned ON and OFF. The ON state is the operation in the power supply short-circuit mode illustrated in FIG. 17. The OFF state is the operation in the charging mode illustrated in FIG. 19.

In the second cycle of the carrier, the first upper-arm element 311 is controlled to be OFF and the second lower-arm element 322 is controlled for boosting operation. In the boosting operation, the ON state and the OFF state are repeated twice. The second upper-arm element 321 is subjected to switching control for synchronous rectification and the first lower-arm element 312 is controlled to be always ON for synchronous rectification. The second upper-arm element 321 is ON during the OFF period of the second lower-arm element 322 so that the second upper-arm element 321 and the second lower-arm element 322 are not simultaneously ON.

As illustrated in the drawing, the second lower-arm element 322 is repeatedly turned ON and OFF. The ON state is the operation in the power supply short-circuit mode (not illustrated). The OFF state is the operation in the charging mode illustrated in FIG. 19.

The third cycle of the carrier has the same operation as the first cycle of the carrier. The fourth cycle of the carrier has the same operation as the second cycle of the carrier (not illustrated).

FIG. 23, which has a longer time span than FIGS. 21 and 22, depicts the waveforms corresponding to four power supply cycles. In order from the upper side, the waveforms of the second drive pulse Xb for driving the first lower-arm element 312, the third drive pulse Ya for driving the second upper-arm element 321, the first drive pulse Xa for driving the first upper-arm element 311, the fourth drive pulse Yb for driving the second lower-arm element 322, and the power supply voltage Vs are illustrated.

In FIG. 23, the enlargement of K5 surrounded by an ellipse shows the waveforms of the first drive pulse Xa, the second drive pulse Xb, the third drive pulse Ya, and the fourth drive pulse Yb illustrated in the time chart of FIG. 21. The enlargement of the waveform of K6 surrounded by an ellipse shows the waveforms of the first drive pulse Xa, the second drive pulse Xb, the third drive pulse Ya, and the fourth drive pulse Yb illustrated in the time chart of FIG. 22.

Regarding the control procedure, the flowchart illustrated in FIG. 13 can be used. This can be achieved simply by replacing steps ST22, ST24, ST26, and ST28 with the above-mentioned process of generating drive pulses.

As apparent from FIGS. 21, 22, and 23, the first upper-arm element 311, the first lower-arm element 312, the second upper-arm element 321, and the second lower-arm element 322 operate equally and evenly. As a result, these arm elements generate heat uniformly, avoiding the situation in which heat generation concentrates on a specific switching element. Therefore, the problem of an increase in the size of a heat sink for cooling a specific switching element is solved. In addition, measures such as securing an air path for cooling and securing a distance to a heat-sensitive component are unnecessary. This solves the problem of an increase in the size and cost of the apparatus.

Although two ON drive pulses are generated in one carrier cycle in FIGS. 21 and 22, the number of ON drive pulses is not limited to two. The number of ON drive pulses may be one or may be three or more.

Owing to the above-described operation, in the AC-DC converting apparatus according to the fourth embodiment, all the arm elements constituting the boost circuit 3, namely the first upper-arm element 311, the first lower-arm element 312, the second upper-arm element 321, and the second lower-arm element 322, operate equally, whereby the concentration of heat generation on a specific arm element can be avoided. This makes it possible to prevent an increase in the size and cost of the apparatus.

Further, since synchronous rectification is applied to the AC-DC converting apparatus according to the fourth embodiment, it is possible to drive the AC-DC converting apparatus with low loss.

Further, in the AC-DC converting apparatus according to the fourth embodiment, the arm element to be caused to perform boosting operation is switched on a carrier cycle basis, where the carrier cycle is faster than the power supply cycle. Therefore, the AC-DC converting apparatus according to the fourth embodiment is more effective in equalizing heat generation between the switching elements than that according to the third embodiment.

Fifth Embodiment

The AC-DC converting apparatus described in the first to fourth embodiments can be applied to a motor drive control apparatus that supplies direct-current power to an inverter. Hereinafter, an example of the application of the AC-DC converting apparatus 100 described in the first to fourth embodiments to a motor drive control apparatus will be described.

Figure 24:
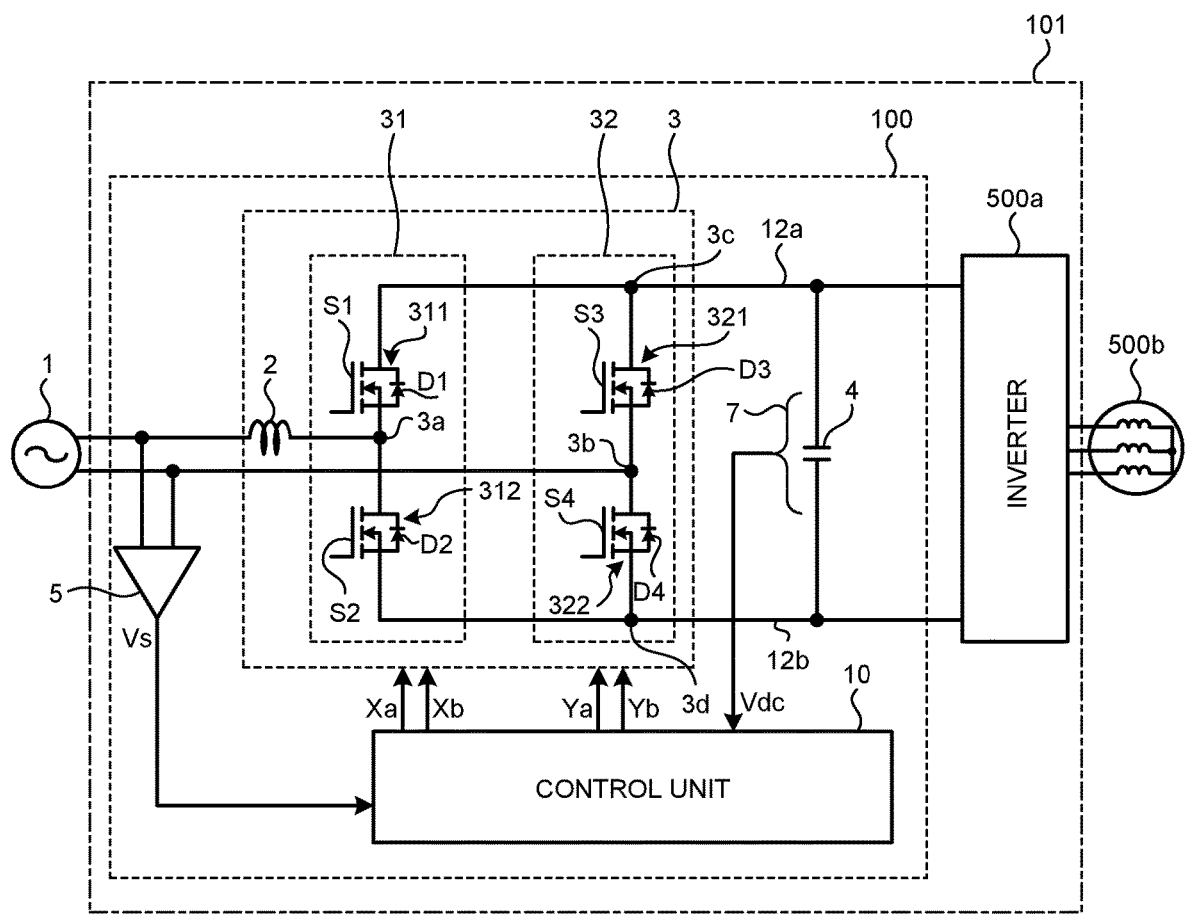
FIG. 24 is a diagram illustrating an example in which the AC-DC converting apparatus described in the first to fourth embodiments is applied to a motor drive control apparatus.

FIG. 24 is a diagram illustrating an example in which the AC-DC converting apparatus described in the first to fourth embodiments is applied to a motor drive control apparatus. A motor drive control apparatus 101 according to a fifth embodiment illustrated in FIG. 24 includes the AC-DC converting apparatus 100 according to the first embodiment and an inverter 500a. As described above, the AC-DC converting apparatus 100 is an apparatus that converts alternating-current power into direct-current power. The inverter 500a is a device that converts direct-current power output from the AC-DC converting apparatus 100 into alternating-current power.

A motor 500b is connected to the output side of the inverter 500a. The inverter 500a drives the motor 500b by supplying the alternating-current power obtained by conversion to the motor 500b.

The motor drive control apparatus 101 illustrated in FIG. 24 can be applied to a product such as a blower, a compressor, and an air conditioner.

Figure 25:
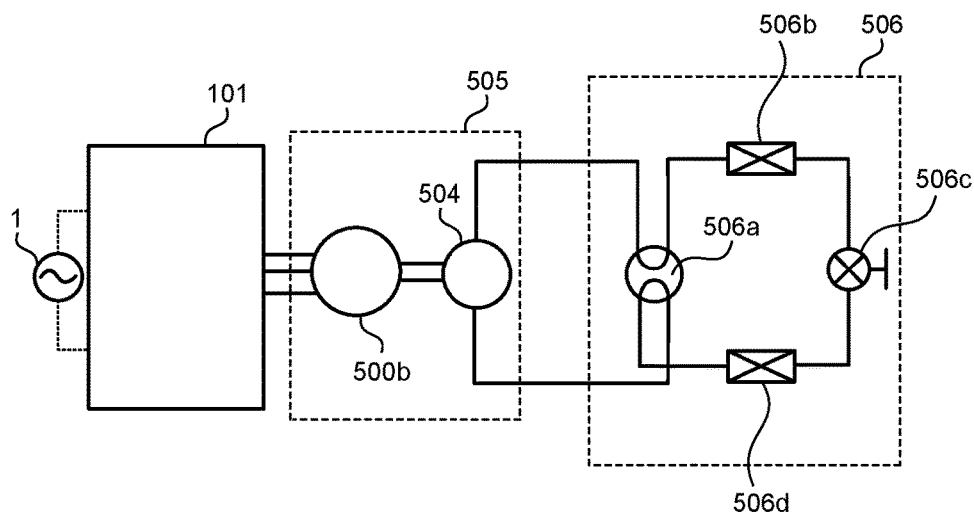
FIG. 25 is a diagram illustrating an example in which the motor drive control apparatus illustrated in FIG. 24 is applied to an air conditioner.

FIG. 25 is a diagram illustrating an example in which the motor drive control apparatus 101 illustrated in FIG. 24 is applied to an air conditioner. The motor 500b is connected to the output side of the motor drive control apparatus 101, and the motor 500b is connected to a compression element 504. A compressor 505 includes the motor 500b and the compression element 504. A refrigeration cycle unit 506 includes a four-way valve 506a, an indoor heat exchanger 506b, an expansion valve 506c, and an outdoor heat exchanger 506d.

The refrigerant circulates through the air conditioner by flowing from the compression element 504 and back to the compression element 504 through the four-way valve 506a, the indoor heat exchanger 506b, the expansion valve 506c, the outdoor heat exchanger 506d, and the four-way valve 506a again. Upon receiving alternating-current power from the alternating-current power supply 1, the motor drive control apparatus 101 rotates the motor 500b. The compression element 504 executes the operation of compressing the refrigerant as the motor 500b rotates, and circulates the refrigerant through the refrigeration cycle unit 506.

Note that the configurations described in the above-mentioned embodiments indicate examples of an aspect of the present invention. The configurations can be combined with another well-known technique, and some of the configurations can be omitted or changed in a range not departing from the gist of the present invention.

The invention claimed is:

1. An AC-DC converting apparatus connected to an alternating-current power supply, the AC-DC converting apparatus comprising:
a boost circuit comprising a reactor, a first leg, and a second leg, and boosting a first voltage output from the alternating-current power supply, the reactor being connected at one end to the alternating-current power supply and being supplied with the first voltage, the first leg comprising a first upper-arm element and a first lower-arm element connected in series, a connection point between the first upper-arm element and the first lower-arm element being connected to another end of the reactor, the second leg being connected in parallel with the first leg and comprising a second upper-arm element and a second lower-arm element connected in series, a connection point between the second upper-arm element and the second lower-arm element being connected to the alternating-current power supply; and
a first voltage detecting unit connected to the alternating-current power supply and detecting the first voltage, wherein
when the first voltage is positive,
the first lower-arm element and the second upper-arm element are caused to perform boosting operation alternately every first cycle that is a cycle of the first voltage, and
when the first voltage is negative, the first upper-arm element and the second lower-arm element are caused to perform boosting operation alternately every first cycle.

2. The AC-DC converting apparatus according to claim 1, wherein
the boosting operation of each of the first upper-arm element, the first lower-arm element, the second upper-arm element, and the second lower-arm element appears once in a period twice as long as the first cycle.

3. The AC-DC converting apparatus according to claim 2, wherein
when the first voltage is positive and the first cycle is an odd cycle, the first lower-arm element is caused to perform boosting operation,
when the first voltage is positive and the first cycle is an even cycle, the second upper-arm element is caused to perform boosting operation,
when the first voltage is negative and the first cycle is an odd cycle, the first upper-arm element is caused to perform boosting operation, and when the first voltage is negative and the first cycle is an even cycle, the second lower-arm element is caused to perform boosting operation.

4. The AC-DC converting apparatus according to claim 2, wherein
when the first voltage is positive and the first cycle is an odd cycle, the second upper-arm element performs boosting operation,
when the first voltage is positive and the first cycle is an even cycle, the first lower-arm element performs boosting operation,
when the first voltage is negative and the first cycle is an odd cycle, the second lower-arm element performs boosting operation, and
when the first voltage is negative and the first cycle is an even cycle, the first upper-arm element performs boosting operation.

5. The AC-DC converting apparatus according to claim 1, wherein
when the first lower-arm element performs boosting operation, the first upper-arm element and the second lower-arm element perform rectifying operation,
when the first upper-arm element performs boosting operation, the first lower-arm element and the second upper-arm element perform rectifying operation,
when the second upper-arm element performs boosting operation, the first upper-arm element and the second lower-arm element perform rectifying operation, and
when the second lower-arm element performs boosting operation, the first lower-arm element and the second upper-arm element perform rectifying operation.

6. A motor drive control apparatus comprising:
the AC-DC converting apparatus according to claim 1; and
an inverter converting direct-current power output from the AC-DC converting apparatus into alternating-current power.

7. A blower comprising the motor drive control apparatus according to claim 6.

8. An air conditioner comprising the blower according to claim 7.

9. A compressor comprising the motor drive control apparatus according to claim 6.

10. An air conditioner comprising the compressor according to claim 9.

11. An AC-DC converting apparatus connected to an alternating-current power supply, comprising:
a boost circuit comprising a reactor, a first leg, and a second leg, and boosting a first voltage output from the alternating-current power supply, the reactor being connected at one end to the alternating-current power supply and being supplied with the first voltage, the first leg comprising a first upper-arm element and a first lower-arm element connected in series, a connection point between the first upper-arm element and the first lower-arm element being connected to another end of the reactor, the second leg being connected in parallel with the first leg and comprising a second upper-arm element and a second lower-arm element connected in series, a connection point between the second upper-arm element and the second lower-arm element being connected to the alternating-current power supply; and
a first voltage detecting unit connected to the alternating-current power supply and detecting the first voltage, wherein
when the first voltage is positive, the first lower-arm element and the second upper-arm element are caused to perform boosting operation alternately every second cycle, the second cycle being shorter than a first cycle that is a cycle of the first voltage, and when the first voltage is negative, the first upper-arm element and the second lower-arm element are caused to perform boosting operation alternately every second cycle.

12. The AC-DC converting apparatus according to claim 11, wherein when the first lower-arm element or the second upper-arm element performs boosting operation, the first upper-arm element and the second lower-arm element are caused to perform rectifying operation, and when the first upper-arm element or the second lower-arm element performs boosting operation, the first lower-arm element and the second upper-arm element are caused to perform rectifying operation.

13. A motor drive control apparatus comprising:

the AC-DC converting apparatus according to claim 11; and an inverter converting direct-current power output from the AC-DC converting apparatus into alternating-current power.

14. A blower comprising the motor drive control apparatus according to claim 13.

15. An air conditioner comprising the blower according to claim 14.

16. A compressor comprising the motor drive control apparatus according to claim 13.

17. An air conditioner comprising the compressor according to claim 16.

* * * * *